(12) United States Patent
Kojima

(10) Patent No.: US 11,318,842 B2
(45) Date of Patent: May 3, 2022

(54) FIRST TRAIN-INSTALLED DEVICE, METHOD, AND RECORDING MEDIUM

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 392 days.

(21) Appl. No.: 16/470,292

(22) PCT Filed: Dec. 18, 2017

(86) PCT No.: PCT/JP2017/045265
§ 371 (c)(1),
(2) Date: Jun. 17, 2019

(87) PCT Pub. No.: WO2018/123679
PCT Pub. Date: Jul. 5, 2018

(65) Prior Publication Data
US 2020/0086901 A1 Mar. 19, 2020

(30) Foreign Application Priority Data
Dec. 27, 2016 (JP) .............................. JP2016-252661

(51) Int. Cl.
B60L 3/00 (2019.01)
B61L 15/00 (2006.01)
(Continued)

(52) U.S. Cl.
CPC ............. *B60L 3/00* (2013.01); *B61L 15/0027* (2013.01); *B61L 25/025* (2013.01); *G08G 1/163* (2013.01); *B61L 2205/00* (2013.01)

(58) Field of Classification Search
CPC ...... B60L 3/00; B60L 15/0027; B60L 25/025; B60L 2205/00; G08G 1/163
See application file for complete search history.

(56) References Cited

U.S. PATENT DOCUMENTS 4,041,878 A * 8/1977 Toran ........................ B61F 5/24
105/164
5,192,903 A * 3/1993 Kita ......................... B61L 23/34
180/167
(Continued)

FOREIGN PATENT DOCUMENTS

JP S61-230532 A 10/1986
JP H08-65817 A 3/1996
(Continued)

OTHER PUBLICATIONS

International Search Report for PCT Application No. PCT/JP2017/045265, dated Mar. 6, 2018.
(Continued)

Primary Examiner — Jason C Smith

(57) ABSTRACT

A first train-installed device according to the present invention includes: a memory; and a processor. The processor performs operations. The operations includes: performing wireless communication through an antenna installed at a front of a train; acquiring train information including information indicating a railroad of the train; transmitting a search signal to another train in a neighborhood of the train; when receiving a response signal including train information including information indicating a railroad on which the another train is on-rail, determining whether there is a possibility of a collision between the train and the another train based on the train information; and when there is a possibility of the collision, measuring a distance between the another train and the train by transmitting and receiving a measurement signal and a measurement response signal to and from the second train-installed device.

7 Claims, 31 Drawing Sheets

(51) Int. Cl.
 *B61L 25/02* (2006.01)
 *G08G 1/16* (2006.01)

(56) References Cited

U.S. PATENT DOCUMENTS

| | | | | |
|---|---|---|---|---|
| 5,394,137 | A * | 2/1995 | Orschek | B60T 17/221 188/1.11 E |
| 5,758,848 | A * | 6/1998 | Beule | B60T 7/128 104/26.1 |
| 5,775,230 | A * | 7/1998 | Joos | B61F 5/22 105/199.2 |
| 6,087,950 | A * | 7/2000 | Capan | B61L 1/14 310/318 |
| 7,027,899 | B2 * | 4/2006 | Mindel | B61L 23/34 701/19 |
| 7,206,676 | B2 * | 4/2007 | Cross | B61L 17/00 246/182 R |
| 8,200,381 | B2 * | 6/2012 | Carroll | B61L 15/0036 701/19 |
| 9,043,131 | B2 * | 5/2015 | Carlson | B61L 23/06 701/301 |
| 10,363,948 | B2 * | 7/2019 | Yamamoto | B61L 25/025 |
| 2003/0182030 | A1 * | 9/2003 | Kraeling | B61L 15/0081 701/19 |
| 2009/0204289 | A1 * | 8/2009 | Lehre | B60W 30/16 701/36 |
| 2011/0108677 | A1 * | 5/2011 | Asuka | B61L 23/14 246/27 |
| 2014/0012439 | A1 * | 1/2014 | Dimmer | B61L 25/025 701/19 |
| 2015/0100285 | A1 * | 4/2015 | Heidinger | G06Q 10/06375 703/2 |
| 2016/0096537 | A1 * | 4/2016 | Bartek | H04W 4/40 246/124 |
| 2018/0105190 | A1 * | 4/2018 | Becke | G08G 1/162 |
| 2018/0327005 | A1 * | 11/2018 | Yamamoto | B60L 15/20 |
| 2020/0086901 | A1 * | 3/2020 | Kojima | B61L 23/34 |

FOREIGN PATENT DOCUMENTS

| | | |
|---|---|---|
| JP | H08-268284 A | 10/1996 |
| JP | 2004-220180 A | 8/2004 |
| JP | 2016-060339 A | 4/2016 |
| WO | 2016/114088 A1 | 7/2016 |
| WO | 2016/156215 A1 | 10/2016 |

OTHER PUBLICATIONS

English translation of Written opinion for PCT Application No. PCT/JP2017/045265.

* cited by examiner

FIRST TRAIN-INSTALLED DEVICE, METHOD, AND RECORDING MEDIUM

This application is a National Stage Entry of PCT/JP2017/045265 filed on Dec. 18, 2017, which claims priority from Japanese Patent Application 2016-252661 filed on Dec. 27, 2016 the contents of all of which are incorporated herein by reference, in their entirety.

TECHNICAL FIELD

The present invention relates to a technology of preventing a collision between trains.

BACKGROUND ART

In order to safely operate trains, a fleet management system (FMS) generally performs control between trains through relaying by a ground control facility. In an emergency such as another train being unexpectedly on-rail in front of a running train, a train driver checks the circumstance by visual observation or the like, and also determines stopping the train. Then, by contacting a staff at the ground control facility, the train driver reports the circumstance of the scene and/or determines resumption of running. Further, an automatic train stop (ATS), an automatic train control (ATC), and the like are known as measures against a human error such as a train driver suffering from a sleep apnea syndrome.

However, when entrusting determination to a train driver, there is a possibility that determination-related stress of a train driver and/or difference in train driver's reactions occur. Further, an installation cost and a maintenance cost of the ATS or the ATC become an issue.

In relation to such an issue, Patent Literature (PTL) 1 describes an example of a technology of preventing a rear-end collision of trains. In the related art, out of two trains running on the same railroad, an interrogation device is equipped in the front part of the following train. Further, a response device is equipped in the rear part of the preceding train. Then, the interrogation device transmits an interrogation signal, and the response device transmits a signal synchronized with the interrogation signal. Then, the interrogation device measures a round-trip propagation time, based on the signal received from the response device, and calculates a distance between the trains.

Further, in relation to such an issue, PTLs 2 and 3 describe examples of technologies of communicating with a moving object. In the related art described in PTL 2, a device installed on the road communicates with a device equipped on each mobile object. At this time, when receiving data from a plurality of mobile objects almost simultaneously, the on-road device transmits polling data to each mobile object. When receiving the polling data, each mobile object transmits data after a time based on priority of the on-road device elapses. Further, in the related art described in PTL 3, an on-board unit transmits polling data to a mobile unit and branches processing depending on whether or not a response from the mobile unit exists. Note that it is assumed that short-distance wireless communication such as Bluetooth® is used as communication between the on-board unit and the mobile unit.

CITATION LIST

Patent Literature

PTL 1: Japanese Unexamined Patent Application Publication No. H08(1996)-268284

PTL 2: Japanese Unexamined Patent Application Publication No. S61(1986)-230532

PTL 3: Japanese Unexamined Patent Application Publication No. 2004-220180

SUMMARY OF INVENTION

Technical Problem

However, the related art described in PTL 1 assumes that trains on which an interrogation device and a response device are respectively equipped run on the same railroad. However, in practice, there is a possibility that a signal transmitted from an interrogation device is received by a response device equipped on another train running on a neighboring railroad. In such a case, the interrogation device calculates a distance from the train running on the other railroad although there is no possibility of a rear-end collision. Thus, when trains are assumed to run on a plurality of railroads, the related art may calculate a distance from a train running on another railroad and cannot provide information suitable in safe operation of trains.

Further, with regard to such an issue, applying the related art described in PTL 2 to the related art described in PTL 1 will be considered. In this case, when receiving a signal from a plurality of response devices, an interrogation device successively receives data according to priority defined on each response device. However, it is difficult to preset priority to each train in order to specify a train running ahead on the same railroad out of trains running in the neighborhood of the train equipped with the interrogation device. Accordingly, even when the related art described in PTL 2 is combined, the aforementioned issue under the assumption that trains run on a plurality of railroads cannot be resolved.

Further, with regard to such an issue, applying the related art described in PTL 3 to the related art described in PTL 1 will be considered. In this case, an interrogation device and a response device equipped on each train running ahead and behind are previously paired. However, a train does not necessarily run on one predetermined railroad. Accordingly, every combination of an interrogation device and a response device assumed to run on the same railroad are previously paired. In that case, there is a possibility that an interrogation device receives a signal from a response device equipped on a train being scheduled to run on the same railroad as the train equipped with the interrogation device but being on-rail on another railroad at that point in time. Accordingly, even when the related art described in PTL 3 is combined, it is difficult to resolve the aforementioned issue under the assumption that trains run on a plurality of railroads.

The present invention has been made in order to resolve the aforementioned issue. That is, an object of the present invention is to provide a technology capable of presenting more suitable information for preventing a collision between trains while holding down an installation cost and a maintenance cost, even when trains are assumed to run on a plurality of railroads.

Solution to Problem

A first train-installed device according to one aspect of the present invention includes:

a memory; and at least one processor coupled to the memory.

The processor performs operations. The operations include:

performing wireless communication through an antenna installed at a front of a train equipped with the first train-installed device;

acquiring train information including information indicating a railroad on which the train is on-rail;

transmitting a search signal for searching for another train in a neighborhood of the train;

when receiving a response signal, the response signal being transmitted by a second train-installed device equipped on the another train in response to reception of the search signal and including train information including information indicating a railroad on which the another train is on-rail, determining whether or not there is a possibility of a collision between the train and the another train, based on the train information included in the response signal and the train information acquired; and when determining that there is a possibility of the collision, measuring a distance between the another train and the train by transmitting and receiving a measurement signal and a measurement response signal indicating a response to the measurement signal to and from the second train-installed device.

A second train-installed device according to one aspect of the present invention includes:

a memory; and at least one processor coupled to the memory.

The processor performs operations. The operations include:

performing wireless communication through an antenna installed at a rear of a train equipped with the second train-installed device;

acquiring train information indicating a railroad on which the train is on-rail;

when receiving the search signal from the first train-installed device according to any one of supplementary notes 1 to 6, including train information acquired in the response signal and transmitting the response signal to the first train-installed device; and when receiving the measurement signal from the first train-installed device, transmitting, to the first train-installed device, the measurement response signal responding to the measurement signal.

A train-collision prevention system according to one aspect of the present invention includes:

the above-mentioned first train-installed device; and the above-mentioned second train-installed device.

A method according to one aspect of the present invention includes, by a first train-installed device:

transmitting a search signal for searching for another train in a neighborhood of a train equipped with the first train-installed device, by wireless communication through an antenna installed at a front of the train;

acquiring train information including information indicating a railroad on which the train is on-rail, when receiving, by the wireless communication, a response signal including train information including information indicating a railroad on which the another train is on-rail, the response signal being transmitted, in response to reception of the search signal, by a second train-installed device equipped on the another train;

determining whether or not there is a possibility of a collision between the train and the another train, based on acquired train information and train information included in the response signal; and, when determining that there is a possibility of the collision, measuring a distance between the another train and the train by transmitting and receiving, by the wireless communication, a measurement signal and a measurement response signal indicating a response to the measurement signal, to and from the second train-installed device.

A non-transitory computer-readable recording medium according to one aspect of the present invention embodies a program. The program causes a computer to perform a method. The method includes:

transmitting a search signal for searching for another train in a neighborhood of a train equipped with a first train-installed device, by wireless communication through an antenna installed at a front of the train;

acquiring train information including information indicating a railroad on which the train is on-rail, when receiving, by the wireless communication, a response signal including train information including information indicating a railroad on which the another train is on-rail, the response signal being transmitted, in response to reception of the search signal, by a second train-installed device equipped on the another train;

determining whether or not there is a possibility of a collision between the train and the another train, based on acquired train information and train information included in the response signal; and when determining that there is a possibility of the collision, measuring a distance between the another train and the train by transmitting and receiving, by the wireless communication, a measurement signal and a measurement response signal indicating a response to the measurement signal, to and from the second train-installed device.

Advantageous Effects of Invention

The present invention can provide a technology capable of presenting more suitable information for preventing a collision between trains while holding down an installation cost and a maintenance cost, even when trains are assumed to run on a plurality of railroads.

EXAMPLE EMBODIMENT

Example embodiments of the present invention will be described in detail below with reference to drawings.

First Example Embodiment

Figure 1:
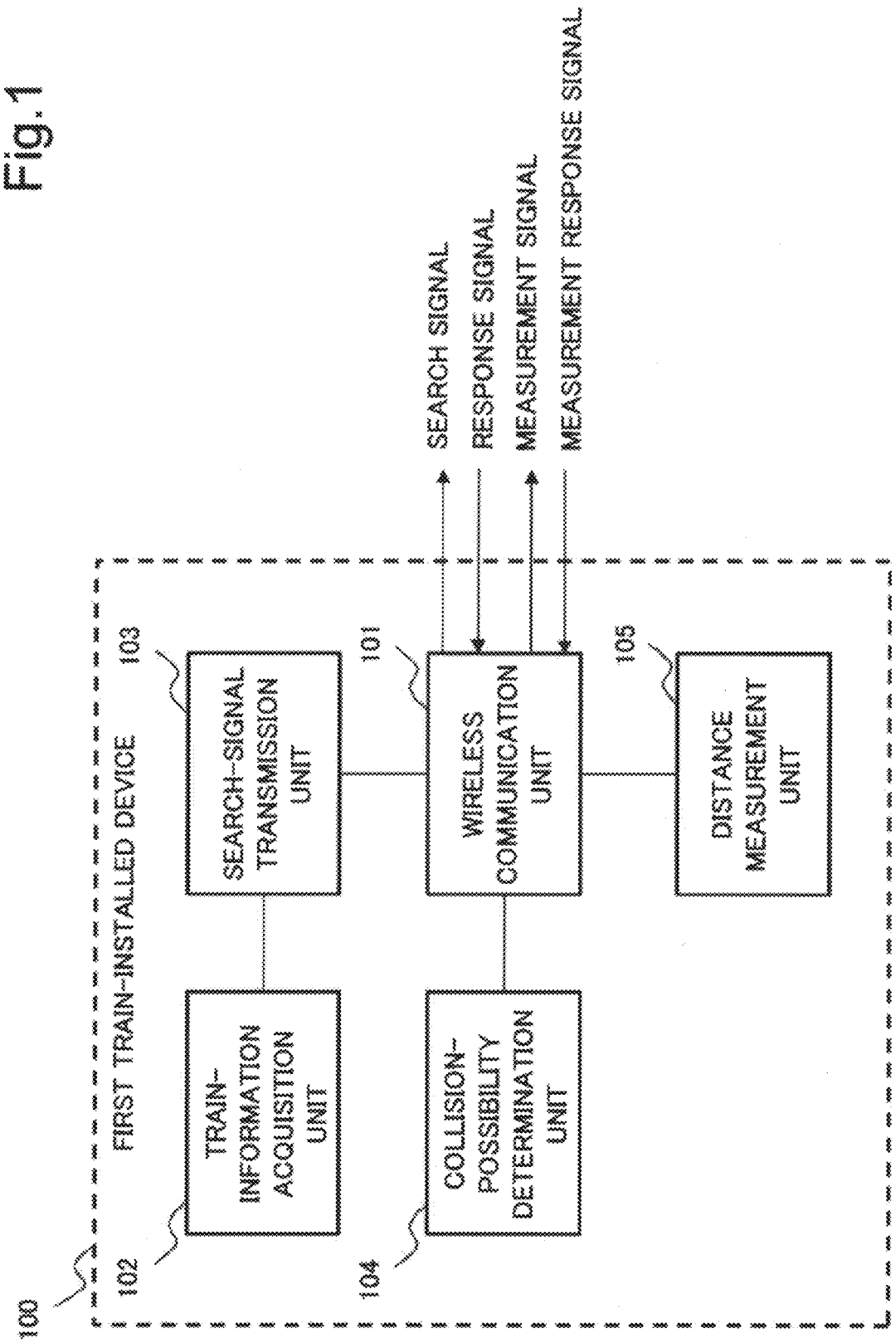
FIG. 1 is a block diagram illustrating a configuration of a first train-installed device according to a first example embodiment of the present invention.

First, a first train-installed device 100 according to a first example embodiment of the present invention will be described with reference to drawings. In FIG. 1, the first train-installed device 100 includes a wireless communication unit 101, a train-information acquisition unit 102, a search-signal transmission unit 103, a collision-possibility determination unit 104, and a distance measurement unit 105.

Figure 2:
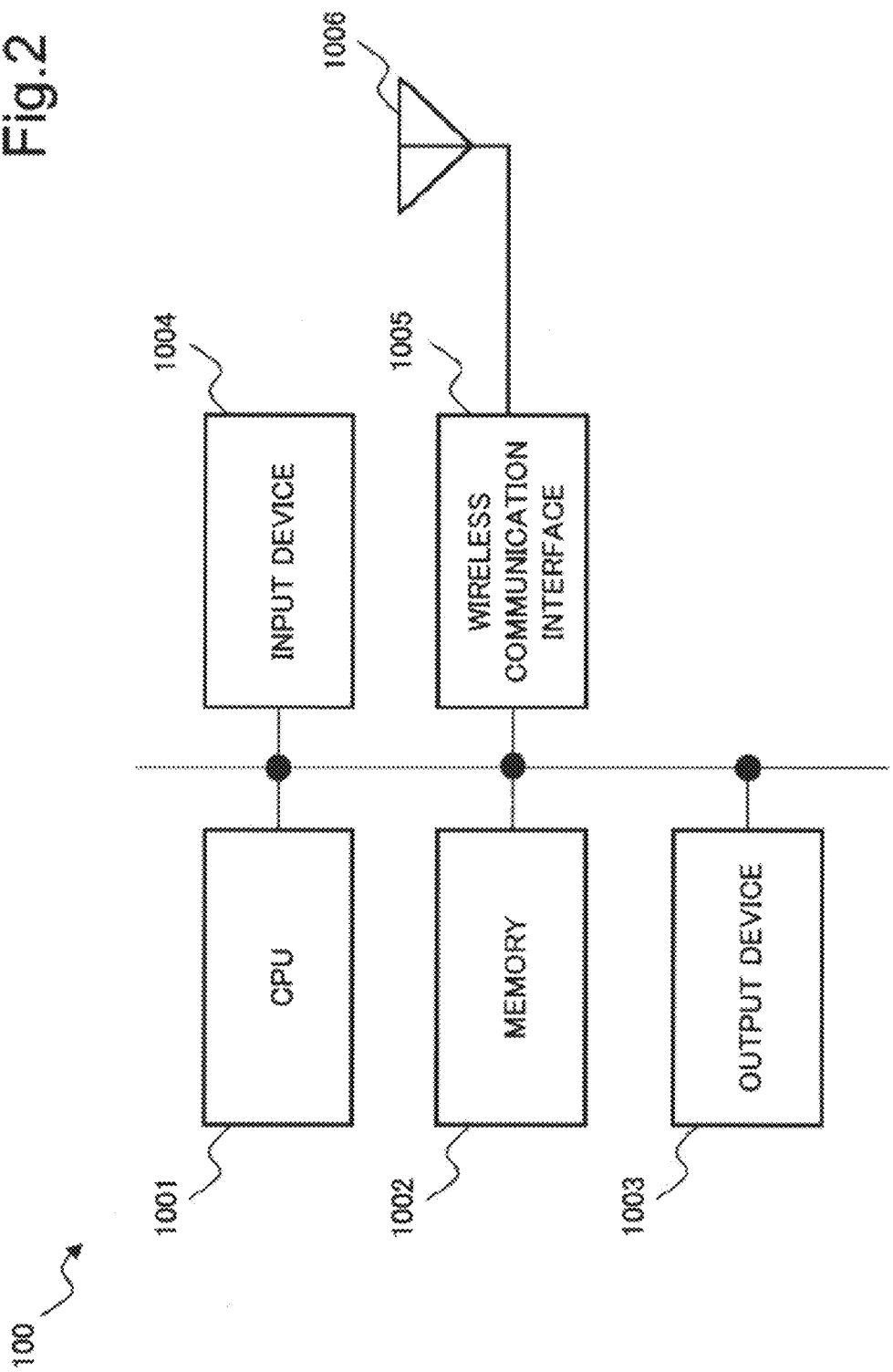
FIG. 2 is a diagram illustrating a hardware configuration example of the first train-installed device according to the first example embodiment of the present invention.

The first train-installed device 100 may be configured with hardware elements as illustrated in FIG. 2. In FIG. 2, the first train-installed device 100 includes a central processing unit (CPU) 1001, a memory 1002, an output device 1003, an input device 1004, a wireless communication interface 1005, and an antenna 1006. The memory 1002 is configured with a random access memory (RAM), a read only memory (ROM), an auxiliary storage device (such as a hard disk), and the like. The output device 1003 is configured with a devices outputting information, such as a display device or a printer. The input device 1004 is configured with a device receiving input of a user operation, such as a keyboard or a mouse. The wireless communication interface 1005 is an interface performing wireless communication with a second train-installed device. Further, the wireless communication interface 1005 outputs data to be transmitted to the antenna 1006. Further, the wireless communication interface 1005 receives data output from the antenna 1006. The antenna 1006 is installed at the front of a train equipped with the first train-installed device 100. Further, the antenna 1006 emits data output from the wireless communication interface 1005 to a space as a radio wave. Further, the antenna 1006 converts a radio wave in a space into data, and outputs the data to the wireless communication interface 1005. In this case, the wireless communication unit 101 is configured with the wireless communication interface 1005 and the antenna 1006. Further, the remaining functional blocks in the first train-installed device 100 are configured with the CPU 1001 reading and executing a computer program stored in the memory 1002, and also controlling each unit. Note that the hardware configurations of the first train-installed device 100 and each functional block in the first train-installed device 100 are not limited to the configurations described above.

Next, details of each functional block will be described.

The wireless communication unit 101 performs wireless communication through the antenna 1006 installed at the front of the train equipped with the first train-installed device.

The train-information acquisition unit 102 acquires train information including information indicating a railroad on which the train is on-rail. Further, train information may include a train ID for identifying the train. For example, the train-information acquisition unit 102 may acquire train information from the memory 1002. In this case, it is assumed that the memory 1002 previously stores train information including information indicating a railroad on which the train is on-rail. Specifically, for example, train information may be previously acquired by communication with a system in an existing ground control facility and be stored in the memory 1002.

The search-signal transmission unit 103 transmits, from the wireless communication unit 101, a search signal for searching for another train in the neighborhood of the train. A search signal is transmitted with a second train-installed device equipped on each of other trains existing within a communicable range from the wireless communication unit 101 as a target. Hereinafter, it is also simply described as the search-signal transmission unit 103 transmits that the search-signal transmission unit 103 transmits information from the wireless communication unit 101.

The collision-possibility determination unit 104 receives a response signal from the wireless communication unit 101. Hereinafter, it is also simply described as the collision-possibility determination unit 104 receives that the collision-possibility determination unit 104 receives information from the wireless communication unit 101. A response signal is transmitted, in response to reception of a search signal, by the second train-installed device equipped on another train. Further, a response signal includes train information of a railroad on which another train is on-rail. Then, based on the train information of another train included in the response signal and the train information of the train acquired by the train-information acquisition unit 102, the collision-possibility determination unit 104 determines whether or not there is a possibility of a collision between the train and another train. For example, when a railroad indicated by the train information of the train and a railroad indicated by the train information of another train are the same, the collision-possibility determination unit 104 may determine that there is a possibility of a collision. The reason is that it is considered that another train is on-rail on the same railroad as the train and also is sufficiently close to the train in such a way that a search signal from the train can be received.

When the collision-possibility determination unit 104 determines that there is a possibility of a collision, the distance measurement unit 105 measures a distance between the train and another train equipped with the second train-installed device being the source of a response signal. Specifically, the distance measurement unit 105 measures a distance between another train and the train, by transmitting and receiving a measurement signal and a measurement response signal indicating a response to the measurement signal through the wireless communication unit 101, to and from the second train-installed device equipped on such another train. A measurement signal is transmitted with the second train-installed device at a designated destination as a target. Hereinafter, it is also simply described as the distance measurement unit 105 transmits and receives that the distance measurement unit 105 transmits and receives information through the wireless communication unit 101.

An operation of the first train-installed device 100 configured as described above will be described with reference to FIG. 3.

Figure 3:
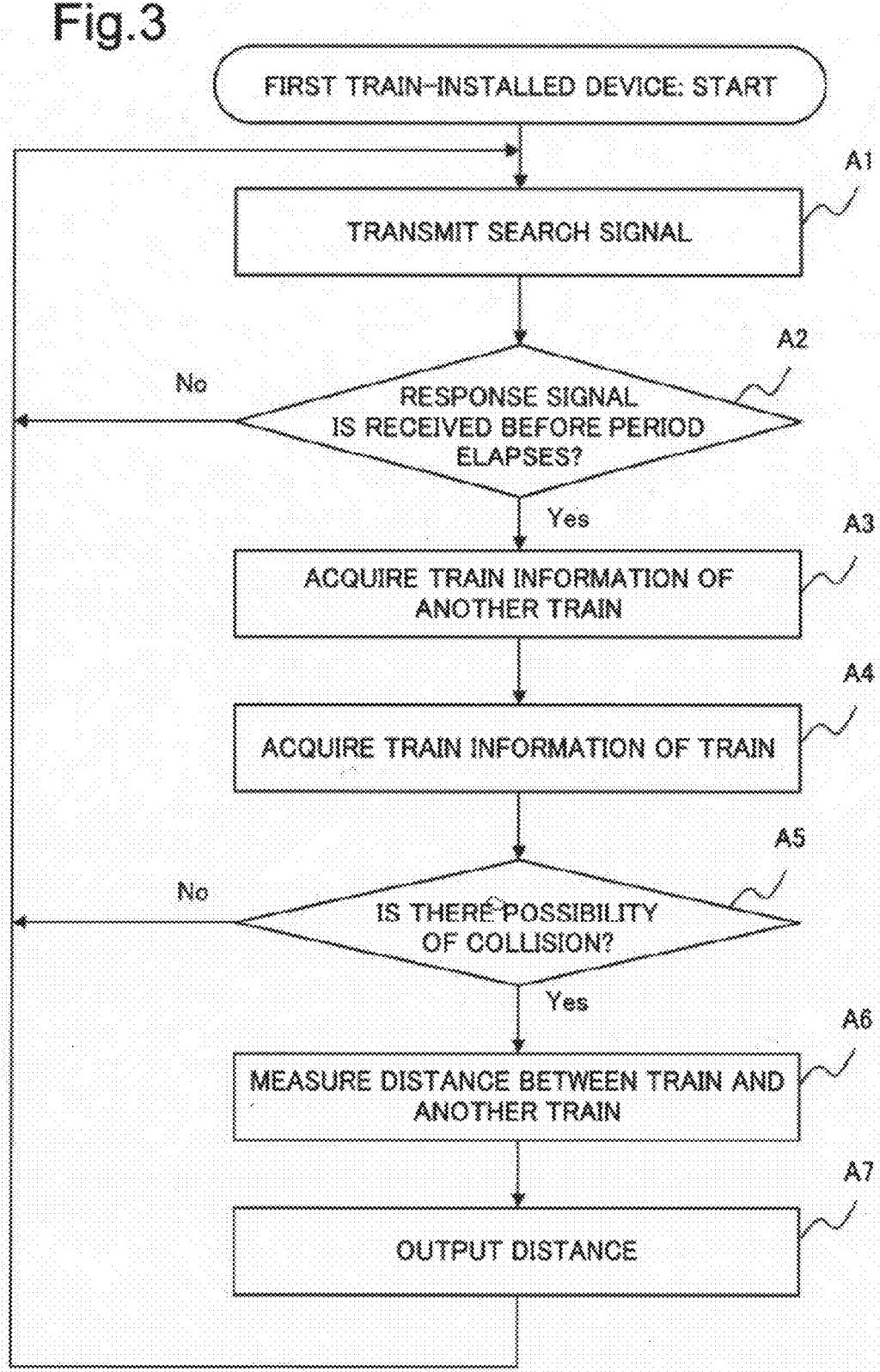
FIG. 3 is a flowchart illustrating an operation of the first train-installed device according to the first example embodiment of the present invention.

In FIG. 3, first, the search-signal transmission unit 103 transmits a search signal (Step A1).

Next, the collision-possibility determination unit 104 determines whether or not a response signal responding to the search signal transmitted in Step A1 is received before a predetermined period elapses after transmission of the search signal (Step A2).

When a response signal is not received before the predetermined period elapses (No in Step A2), the first train-installed device 100 repeats the operation from Step A1.

On the other hand, when a response signal is received before the predetermined period elapses (Yes in Step A2), the collision-possibility determination unit 104 acquires train information of another train included in the response signal (Step A3).

Further, the collision-possibility determination unit 104 acquires train information of the train by using the train-information acquisition unit 102 (Step A4).

Next, based on the train information of another train and the train information of the train, the collision-possibility determination unit 104 determines whether or not there is a possibility of a collision between the train and another train (Step A5).

When determining that there is no possibility of a collision (No in Step A5), the first train-installed device 100 repeats the operation from Step A1.

On the other hand, when it is determined that there is a possibility of a collision (Yes in Step A5), the distance measurement unit 105 operates as follows. That is, the distance measurement unit 105 measures a distance between the train and another train by transmitting and receiving a measurement signal and a measurement response signal for the measurement signal, to and from the second train-installed device equipped on another train (Step A6).

Note that, in Step A6, the distance measurement unit 105 may calculate a distance by transmitting and receiving a measurement signal and a measurement response signal a plurality of number of times.

Then, the distance measurement unit 105 outputs the measured distance (Step A7). For example, an output destination may be the output device 1003. Then, the first train-installed device 100 repeats the operation from Step A1.

Next, an effect of the first example embodiment of the present invention will be described.

The first train-installed device according to the first example embodiment of the present invention can present more suitable information for preventing a collision between trains while holding down an installation cost and a maintenance cost, even when trains are assumed to run on a plurality of railroads.

The reason will be described. According to the present example embodiment, the wireless communication unit performs wireless communication through an antenna installed at the front of the train equipped with the first train-installed device. Further, the train-information acquisition unit acquires train information including information indicating a railroad on which the train is on-rail. Then, the search-signal transmission unit transmits, from the wireless communication unit, a search signal for searching for another train in the neighborhood of the train. Then, the collision-possibility determination unit receives, from the wireless communication unit, a response signal transmitted, in response to reception of the search signal, by the second train-installed device equipped on another train. The response signal includes train information including information indicating a railroad on which another train is on-rail. Then, based on the train information included in the response signal and the train information acquired by the train-information acquisition unit, the collision-possibility determination unit determines whether or not there is a possibility of a collision between the train and another train. Then, when it is determined that there is a possibility of a collision, the distance measurement unit measures a distance between another train and the train. Specifically, the distance measurement unit measures a distance between another train and the train, by transmitting and receiving a measurement signal and a measurement response signal for the measurement signal through the wireless communication unit, to and from the second train-installed device equipped on such another train.

Thus, the present example embodiment searches for another train equipped with the second train-installed device being the source of a response signal responding to a search signal as another train in the neighborhood. Searched another train exists within a communicable range from the antenna at the front of the train. Then, when determining that there is a possibility of a collision, based on train information of searched another train and train information of the train, the present example embodiment measures a distance between the trains. On the other hand, when determining that there is no possibility of a collision with searched another train, the present example embodiment does not measure a distance between the trains. Accordingly, the present example embodiment can suitably determine another train with a possibility of a collision and present a distance from such another train as suitable information for preventing a collision between trains.

Furthermore, such a configuration of the present example embodiment is mainly provided by hardware and software equipped on a train. Accordingly, the present example embodiment does not require a facility requiring construction other than trains (for example, a facility required to be constructed for each railroad), and reduces an installation cost. Further, the present example embodiment can collectively perform software update on a plurality of trains at a depot or the like. Further, the present example embodiment is infrastructure-less, and therefore facilitates replacement in a case of a hardware failure. Accordingly, such a configuration of the present example embodiment reduces a maintenance cost.

Second Example Embodiment

Next, a second example embodiment of the present invention will be described in detail with reference to drawings. Note that, in each drawing referred to in the description of the present example embodiment, the same configuration as and a step operating similarly to those according to the first example embodiment of the present invention are given the same signs, and detailed description in the present example embodiment is omitted.

Figure 4:
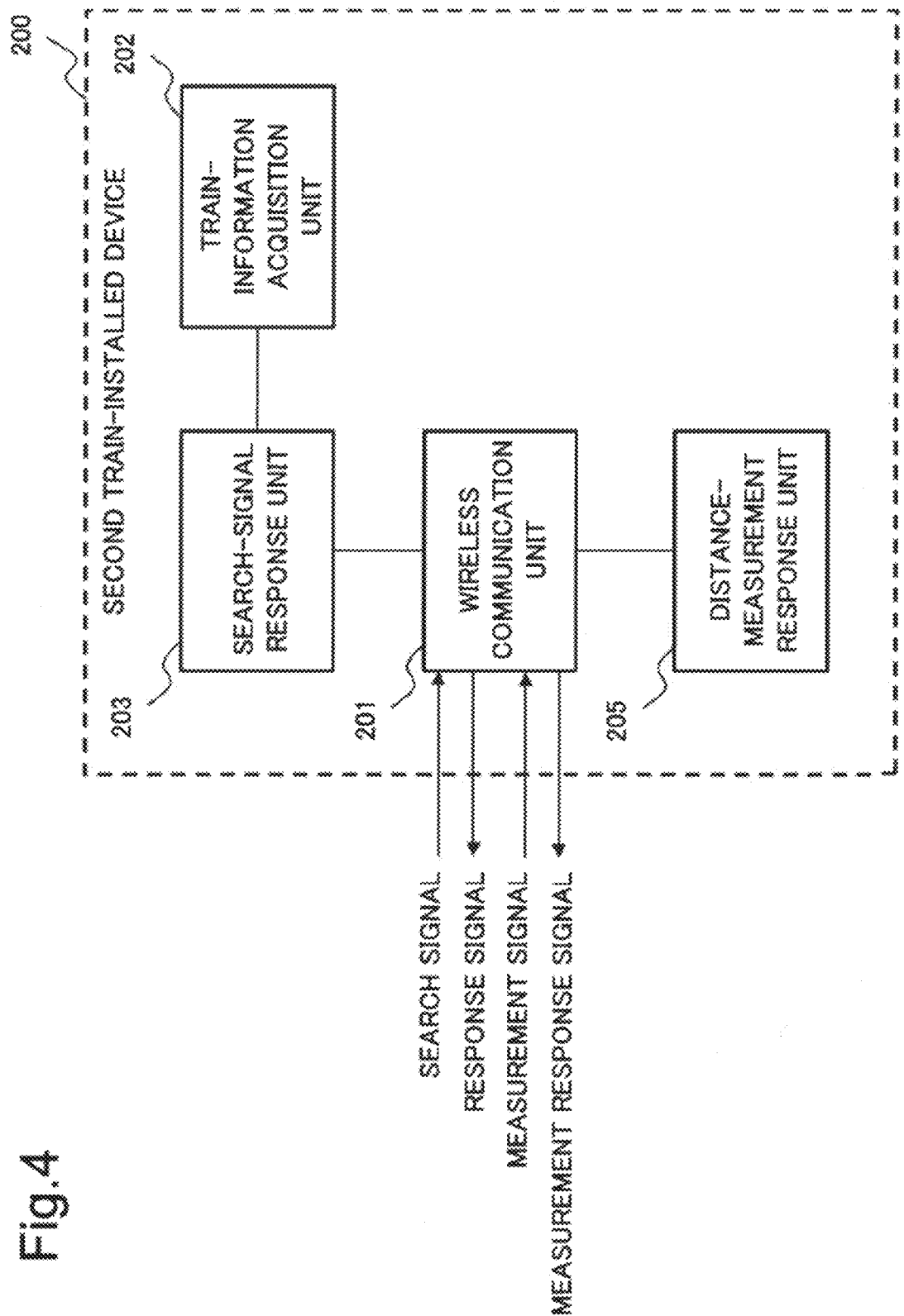
FIG. 4 is a block diagram illustrating a configuration of a second train-installed device according to a second example embodiment of the present invention.

First, FIG. 4 illustrates a configuration of a second train-installed device 200 according to the second example embodiment of the present invention. In FIG. 4, the second train-installed device 200 includes a wireless communication unit 201, a train-information acquisition unit 202, a search-signal response unit 203, and a distance-measurement response unit 205.

Figure 5:
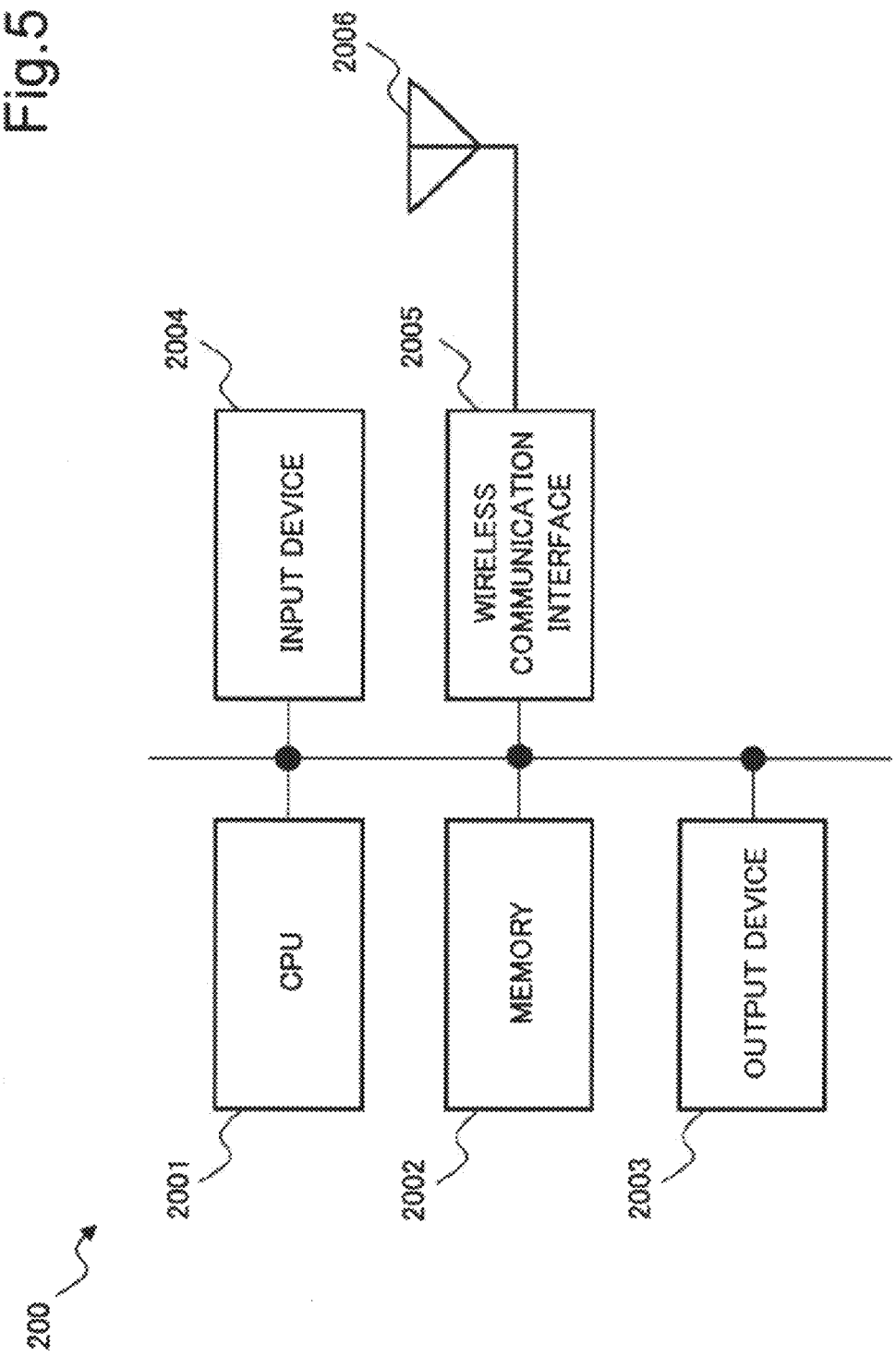
FIG. 5 is a diagram illustrating a hardware configuration example of the second train-installed device according to the second example embodiment of the present invention.

The second train-installed device 200 may be configured with hardware elements as illustrated in FIG. 5. In FIG. 5, the second train-installed device 200 includes a CPU 2001, a memory 2002, an output device 2003, an input device 2004, a wireless communication interface 2005, and an antenna 2006. The memory 2002 is configured with a RAM, a ROM, an auxiliary storage device, and the like. The output device 2003 is configured with a device outputting information, such as a display device or a printer. The input device 2004 is configured with a device receiving input of a user operation, such as a keyboard or a mouse. The wireless communication interface 2005 is an interface performing wireless communication with the first train-installed device. Further, the wireless communication interface 2005 outputs data to be transmitted to the antenna 2006. Further, the wireless communication interface 2005 receives data output from the antenna 2006. The antenna 2006 is installed at the rear of a train equipped with the second train-installed device 200. The antenna 2006 emits data output from the wireless communication interface 2005 to a space as a radio wave. Further, the antenna 2006 converts a radio wave in a space into data and outputs the data to the wireless communication interface 2005. In this case, the wireless communication unit 201 is configured with the wireless communication interface 2005 and the antenna 2006. Further, the remaining functional blocks in the second train-installed device 200 are configured with the CPU 2001 reading and executing a computer program stored in the memory 2002, and also controlling each unit. Note that the hardware configurations of the second train-installed device 200 and each functional block in the second train-installed device 200 are not limited to the configurations described above.

Next, details of each functional block will be described.

The wireless communication unit 201 performs wireless communication through the antenna 2006 installed at the rear of the train equipped with the second train-installed device.

The train-information acquisition unit 202 is configured similarly to the train-information acquisition unit 102 in the first train-installed device 100 according to the first example embodiment of the present invention.

The search-signal response unit 203 receives a search signal from the first train-installed device 100 through the wireless communication unit 201. Then, the search-signal response unit 203 includes train information acquired by the train-information acquisition unit 202 in a response signal, and transmits the response signal to the first train-installed device 100 through the wireless communication unit 201. Hereinafter, it is also simply described as the search-signal response unit 203 transmits and receives that the search-signal response unit 203 transmits and receives information through the wireless communication unit 201.

The distance-measurement response unit 205 receives a measurement signal from a first train-installed device 100 through the wireless communication unit 201. Further, the distance-measurement response unit 205 transmits a measurement response signal responding to the received measurement signal to the first train-installed device 100 through the wireless communication unit 201. Hereinafter, it is also simply described as the distance-measurement response unit 205 transmits and receives that the distance-measurement response unit 205 transmits and receives information through the wireless communication unit 201.

An operation of the second train-installed device 200 configured as described above will be described with reference to FIG. 6.

Figure 6:
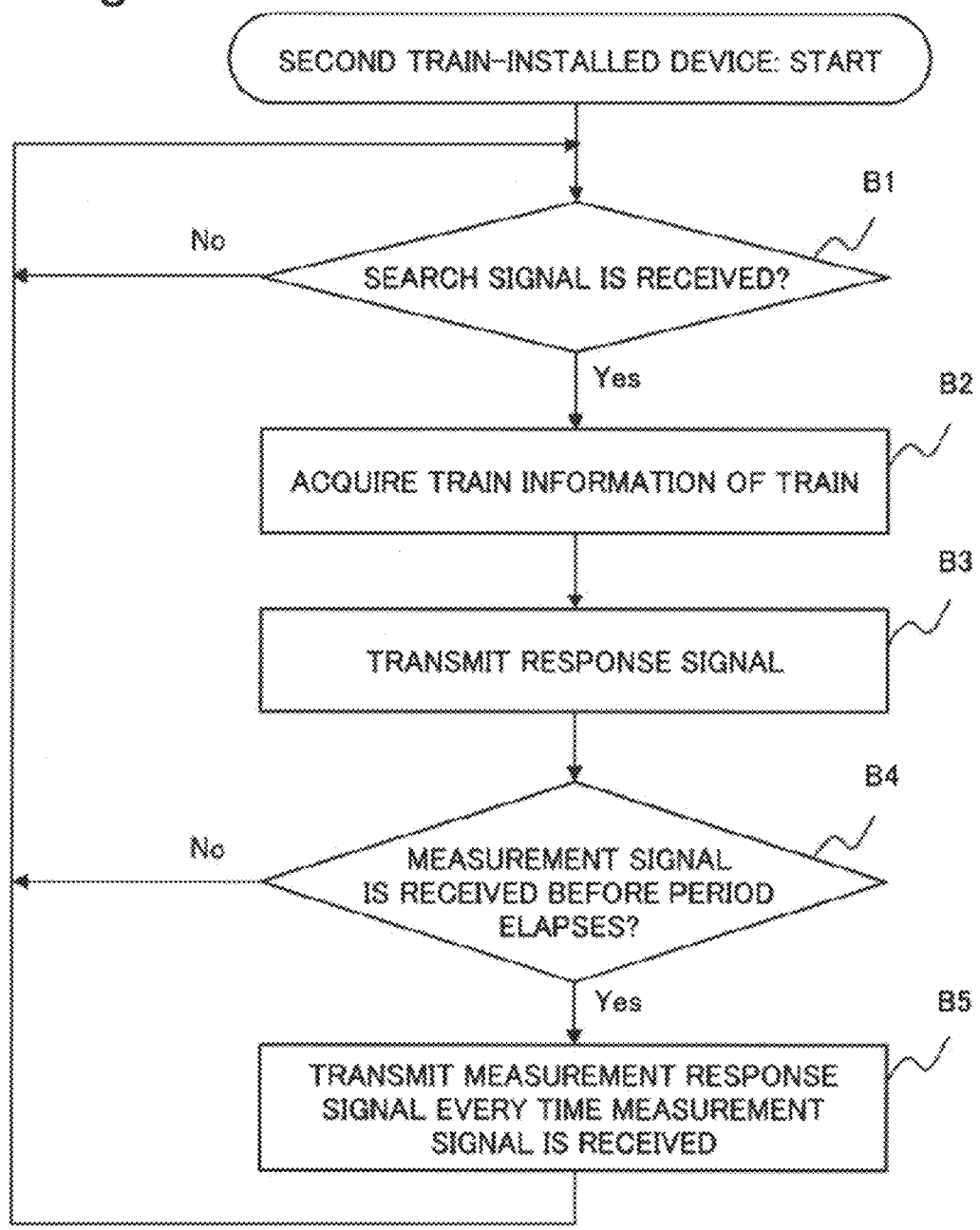
FIG. 6 is a flowchart illustrating an operation of the second train-installed device according to the second example embodiment of the present invention.

In FIG. 6, first, the search-signal response unit 203 determines whether or not a search signal is received (Step B1). When a search signal is not received (No in Step B1), the search-signal response unit 203 repeats Step B1.

When a search signal is received (Yes in Step B1), the search-signal response unit 203 acquires train information of the train by using the train-information acquisition unit 202 (Step B2).

Next, the search-signal response unit 203 includes the acquired train information in a response signal, and transmits the response signal to the first train-installed device 100 (Step B3).

Next, the distance-measurement response unit 205 determines whether or not a measurement signal is received before a predetermined period elapses after transmission of the response signal (Step B4).

When a measurement signal is not received before the predetermined period elapses (No in Step B4), the second train-installed device 200 repeats the operation from Step B1.

On the other hand, when a measurement signal is received (Yes in Step B4), the distance-measurement response unit 205 transmits a measurement response signal to the first train-installed device 100 (Step B5). Note that the second train-installed device 200 may receive a measurement signal from the first train-installed device 100 a plurality of number of times. In this case, the distance measurement unit 105 may transmit a measurement response signal every time a measurement signal is received. Then, the second train-installed device 200 repeats the operation from Step B1.

Next, an effect of the second example embodiment of the present invention will be described.

The second train-installed device according to the second example embodiment of the present invention can provide the following, even when trains are assumed to run on a plurality of railroads. That is, the second train-installed device according to the second example embodiment can provide the first train-installed device with information required for determining a possibility of a collision between trains while holding down an installation cost and a maintenance cost.

The reason will be described. According to the present example embodiment, the wireless communication unit performs wireless communication through the antenna installed at the rear of the train equipped with the second train-installed device. Then, the train-information acquisition unit acquires train information indicating a railroad on which the train is on-rail. Then, when receiving a search signal from the first train-installed device through the wireless communication unit, the search-signal response unit includes the train information acquired by the train-information acquisition unit in a response signal, and transmits the response signal to the first train-installed device through the wireless communication unit. Then, when receiving a measurement signal from the first train-installed device through the wireless communication unit, the distance-measurement response unit transmits a measurement response signal responding to the received measurement signal to the first train-installed device through the wireless communication unit.

Thus, in response to reception of a search signal, the present example embodiment transmits a response signal including train information of the train to the first train-installed device being the source of the search signal. At this time, another train equipped with the first train-installed device being the source of the search signal exists within a communicable range from the antenna at the rear of the train. The present example embodiment can provide the first train-installed device equipped on such another train existing in the neighborhood with train information of the train as a basis for determination of whether or not there is a possibility of a collision with the train.

Furthermore, as described as an effect of the first example embodiment of the present invention, such a configuration of the present example embodiment holds down an installation cost and a maintenance cost.

Third Example Embodiment

Next, a third example embodiment of the present invention will be described in detail with reference to drawings. Note that, in each drawing referred to in the description of the present example embodiment, the same configuration as and a step operating similarly to those according to the first and second example embodiments of the present invention are given the same signs, and detailed description in the present example embodiment is omitted.

Figure 7:
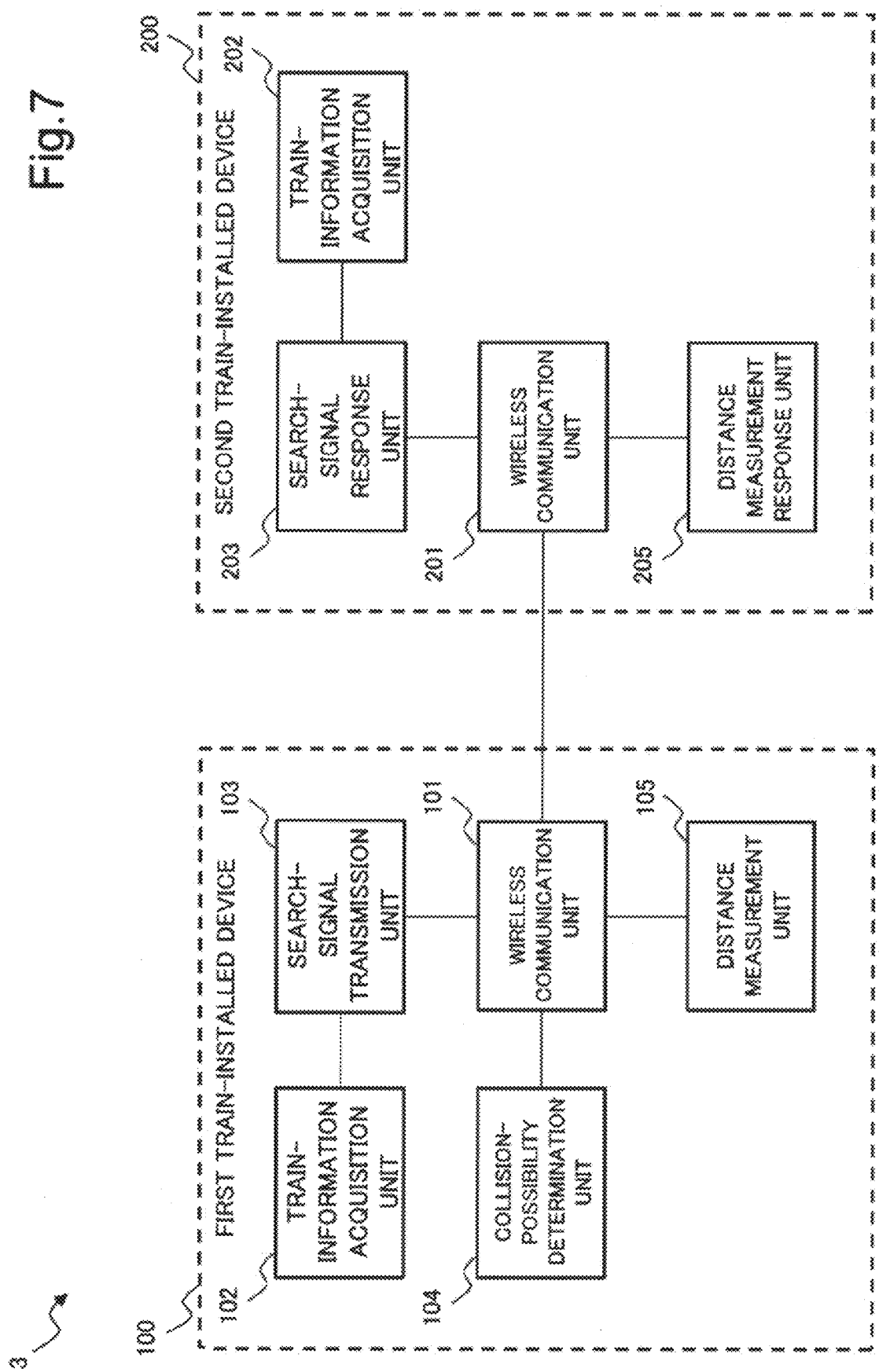
FIG. 7 is a block diagram illustrating a configuration of a train-collision prevention system according to a third example embodiment of the present invention.

First, FIG. 7 illustrates a configuration of a train-collision prevention system 3 according to the third example embodiment of the present invention. In FIG. 7, the train-collision prevention system 3 includes the first train-installed device 100 according to the first example embodiment of the present invention and the second train-installed device 200 according to the second example embodiment of the present invention.

The configurations and operations of the first train-installed device 100 and the second train-installed device 200 are as described in the first and second example embodiments of the present invention.

An operation of the train-collision prevention system 3 will be described with sequence diagrams in FIGS. 8 and 9.

Figure 8:
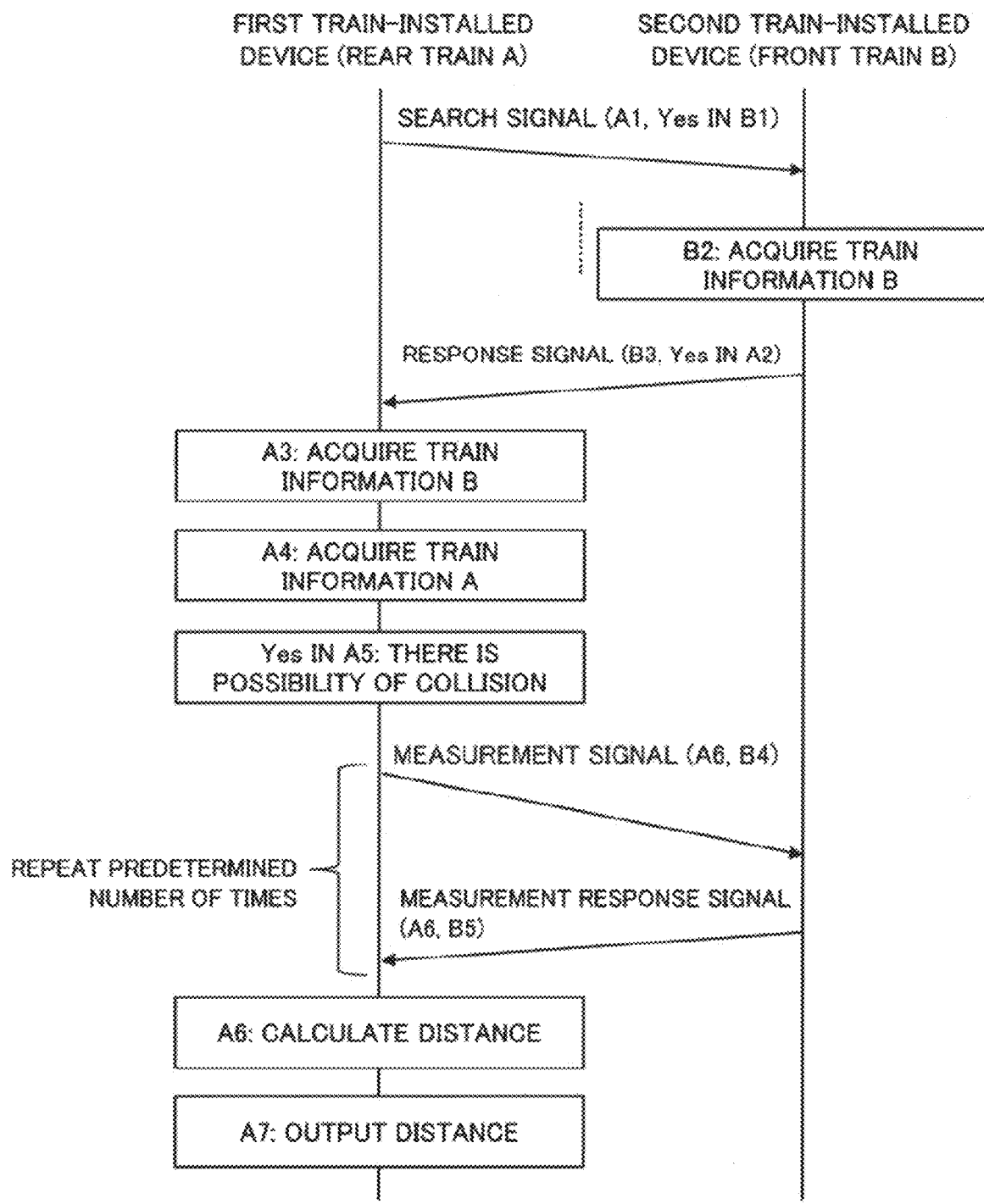
FIG. 8 is a sequence diagram illustrating an operation of the train-collision prevention system according to the third example embodiment of the present invention.

It is assumed in FIG. 8 that a train A equipped with the first train-installed device 100 and a train B equipped with the second train-installed device 200 are on-rail on the same railroad within an inter-communicable range. It is further assumed that traveling directions of the trains A and B are the same, and the train A runs behind and the train B runs ahead.

In FIG. 8, first, in the first train-installed device 100, the search-signal transmission unit 103 equipped on the train A transmits a search signal (Step A1). Then, in the second train-installed device 200 equipped on the train B, the search-signal response unit 203 receives the search signal (Yes in Step B1).

Next, in the second train-installed device 200, the search-signal response unit 203 acquires train information of the train B being the train equipped with the second train-installed device 200 by using the train-information acquisition unit 202 (Step B2). Hereinafter, the train information of the train B is also described as train information B.

Next, in the second train-installed device 200, the search-signal response unit 203 includes the acquired train information B in a response signal, and transmits the response signal to the first train-installed device 100 (Step B3).

Next, in the first train-installed device 100, the collision-possibility determination unit 104 determines that a response signal is received before a predetermined period elapses after transmission of the search signal (Yes in Step A2).

Next, the collision-possibility determination unit 104 acquires the train information B included in the response signal (Step A3).

Further, the collision-possibility determination unit 104 acquires train information of the train A being the train equipped with the first train-installed device 200 by using the train-information acquisition unit 102 (Step A4). Hereinafter, the train information of the train A is also described as train information A.

Next, based on the train information A and the train information B, the collision-possibility determination unit 104 determines whether or not there is a possibility of a collision between the trains A and B. Since the train information A and the train information B indicate the same railroad, it is determined that there is a possibility of a collision (Yes in Step A5).

Then, the distance measurement unit 105 measures a distance between the trains A and B, by transmitting and receiving a measurement signal and a measurement response signal to and from the second train-installed device 200 equipped on the train B (Step A6).

Further, in the second train-installed device 200, the distance-measurement response unit 205 transmits a measurement response signal to the first train-installed device 100, in response to reception of the measurement signal (Steps B4, B5).

Then, in the first train-installed device 100, the distance measurement unit 105 calculates a distance between the trains A and B based on the measurement signal and the measurement response signal, and outputs the distance (Steps A6, A7).

Figure 9:
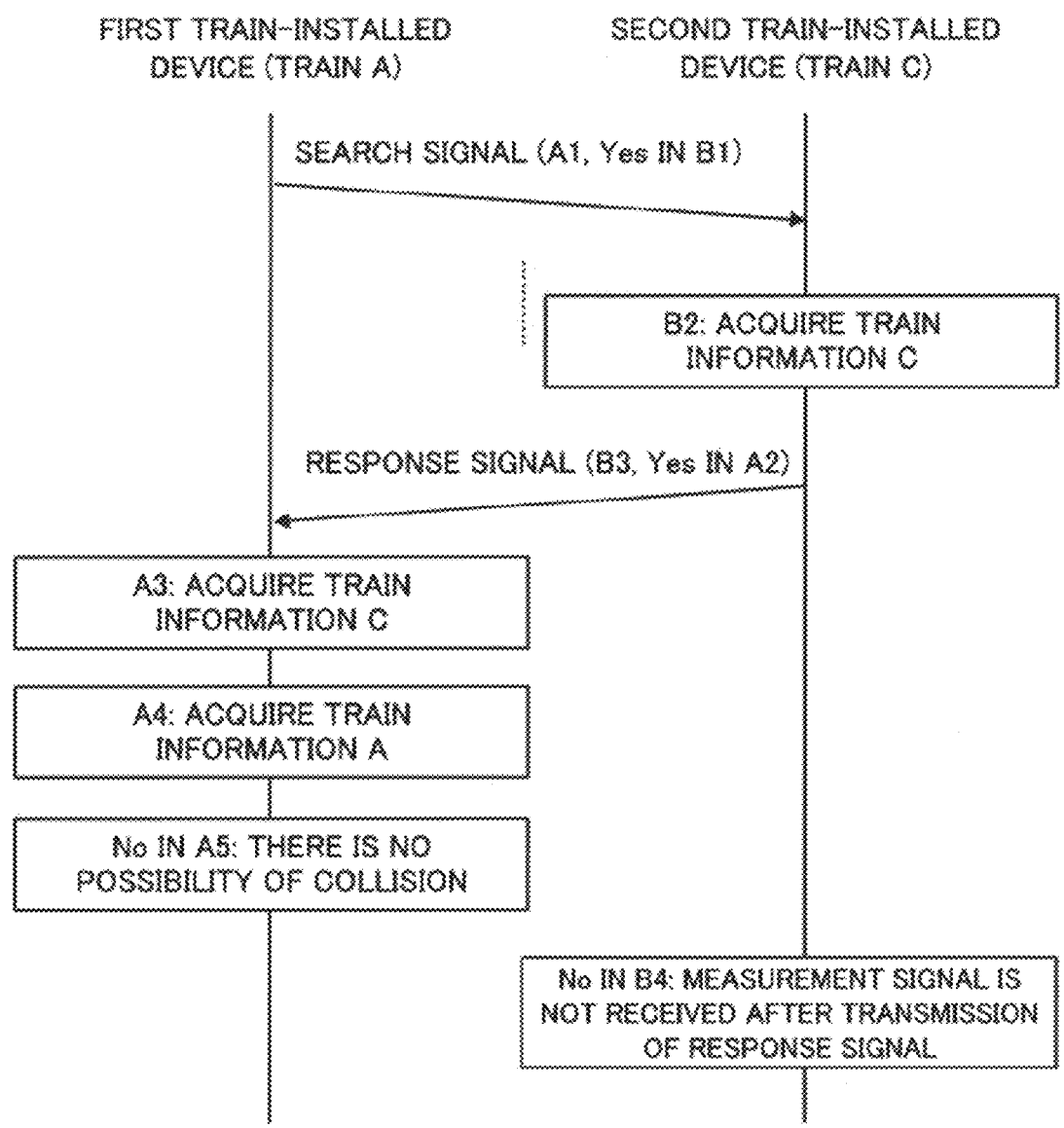
FIG. 9 is a sequence diagram illustrating another operation of the train-collision prevention system according to the third example embodiment of the present invention.

Further, it is assumed in FIG. 9 that a train A equipped with the first train-installed device 100 and a train C equipped with the second train-installed device 200 exist within an inter-communicable range but are on-rail on different railroads.

In FIG. 9, first, in the first train-installed device 100 equipped on the train A, the search-signal transmission unit 103 transmits a search signal (Step A1). Then, in the second train-installed device 200 equipped on the train C, the search-signal response unit 203 receives the search signal (Yes in Step B1).

Next, in the second train-installed device 200, the search-signal response unit 203 acquires train information of the train C being the train equipped with the second train-installed device 200 by using the train-information acquisition unit 202 (Step B2). Hereinafter, the train information of the train C is also described as train information C.

Next, in the second train-installed device 200, the search-signal response unit 203 includes the acquired train information C in a response signal, and transmits the response signal to the first train-installed device 100 (Step B3).

Next, in the first train-installed device 100, the collision-possibility determination unit 104 determines that a response signal is received before a predetermined period elapses after transmission of the search signal (Yes in Step A2).

Next, the collision-possibility determination unit 104 acquires the train information C included in the response signal (Step A3).

Further, the collision-possibility determination unit 104 acquires train information A of the train A by using the train-information acquisition unit 102 (Step A4).

Next, based on the train information A and the train information C, the collision-possibility determination unit 104 determines whether or not there is a possibility of a collision between the trains A and C. Since the train information A and the train information C indicate different railroads, it is determined that there is no possibility of a collision (No in Step A5).

Then, the first train-installed device 100 on the train A ends the processing based on the response signal received in Step A2.

Further, in the second train-installed device 200, since a measurement signal is not received before a predetermined period elapses after transmission of the response signal (No in Step B4), the distance-measurement response unit 205 ends the processing based on the transmitted response signal.

The above concludes the description of the operation of the train-collision prevention system 3.

Figure 10:
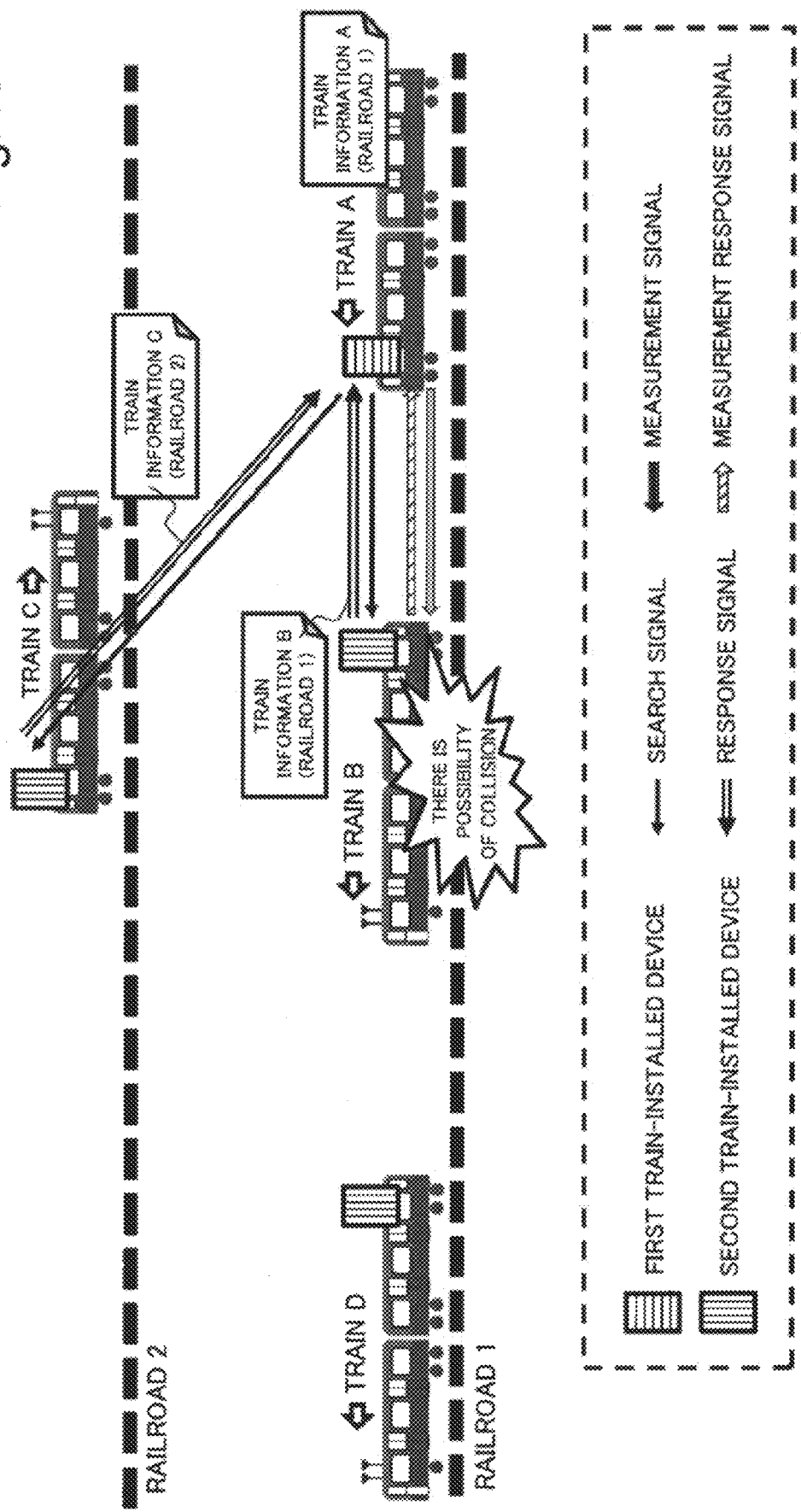
FIG. 10 is a schematic diagram illustrating a specific example of the train-collision prevention system according to the third example embodiment of the present invention.

Next, FIG. 10 schematically illustrates a specific example of the present example embodiment. In FIG. 10, trains A, B, and D are on-rail on a railroad 1. Further, each of the trains A, B, and D is running in a direction indicated by an outlined arrow. Further, the train B is ahead of the train A. Further, the train D is ahead of the train B. Further, a train C is on-rail on a railroad 2 and is running in a direction indicated by an outlined arrow.

At this time, the search-signal transmission unit 103 in the first train-installed device 100 equipped on the train A transmits a search signal. The search signal is received by the second train-installed devices 200 equipped on the trains B and C. The second train-installed device 200 equipped on the train D is not within a communicable range from the first train-installed device 100 on the train A and therefore does not receive the search signal. It is considered that there is no possibility of a collision between trains at a distance that is not within the communicable range between the train-installed devices.

The search-signal response unit 203 in the second train-installed device 200 on the train B transmits a response signal including train information B indicating "RAILROAD 1" to the first train-installed device 100 on the train A. Further, the search-signal response unit 203 in the second train-installed device 200 on the train C transmits a response signal including train information C indicating "RAILROAD 2" to the first train-installed device 100 on the train A.

Then, the collision-possibility determination unit 104 in the first train-installed device 100 on the train A determines that there is a possibility of a collision with respect to the response signal including the train information B indicating the same railroad as "RAILROAD 1" indicated by the train information A of the train A. Then, the distance measurement unit 105 calculates a distance between the trains A and B. On the other hand, the collision-possibility determination unit 104 in the first train-installed device 100 on the train A determines that there is no possibility of a collision with respect to the response signal including the train information C indicating a railroad different from "RAILROAD 1" indicated by the train information A of the train A. Accordingly, the distance measurement unit 105 does not calculate a distance between the trains A and C.

The above concludes the description of the specific example.

Next, an effect of the third example embodiment of the present invention will be described.

The train-collision prevention system according to the third example embodiment of the present invention can present more suitable information for preventing a collision between trains while holding down an installation cost and a maintenance cost, even when trains are assumed to run on a plurality of railroads.

The reason will be described. According to the present example embodiment, the first train-installed device equipped on a train 1 searches for a train 2 equipped with the second train-installed device being the source of a response signal responding to a search signal transmitted from an antenna at the front of the train 1. The antenna equipped at the rear of the searched-for train 2 exists within a communicable range from the antenna at the front of the train 1. Then, the second train-installed device equipped on the searched-for train 2 includes train information of the train 2 in a response signal, and transmits the response signal to the first train-installed device on the train 1. Then, based on the train information of the train 2 included in the received response signal and train information of the train 1 being the train equipped with the first train-installed device 200, the first train-installed device on the train 1 determines whether or not there is a possibility of a collision between the trains 1 and 2. Then, when determining that there is a possibility of a collision, the first train-installed device on the train 1 measures a distance between the trains 1 and 2. On the other hand, when determining that there is no possibility of a collision, the first train-installed device on the train 1 does not perform the processing of measuring a distance between the trains 1 and 2.

Thus, when first and second train-installed devices respectively equipped on different trains exist within an inter-communicable range, the present example embodiment determines whether or not there is a possibility of a collision, based on train information of one another. Herewith, when there is a possibility of a collision such as a case of two trains being on-rail on the same railroad and being close to one another in such a way as to be inter-communicable, the present example embodiment presents a distance between the two trains. On the other hand, when there is no possibility of a collision such as a case of two trains being close to one another in such a way as to be inter-communicable but are on-rail on different railroads, the present example embodiment does not measure a distance between the two trains. Consequently, the present example embodiment can output a distance between trains having a possibility of a collision, as suitable information for preventing a collision between trains.

Furthermore, as described as an effect of the first example embodiment of the present invention, such a configuration of the present example embodiment holds down an installation cost and a maintenance cost.

Fourth Example Embodiment

Next, a fourth example embodiment of the present invention will be described in detail with reference to drawings. Note that, in each drawing referred to in the description of the present example embodiment, the same configuration as and a step operating similarly to those according to the first to third example embodiments of the present invention are given the same signs, and detailed description in the present example embodiment is omitted.

Figure 11:
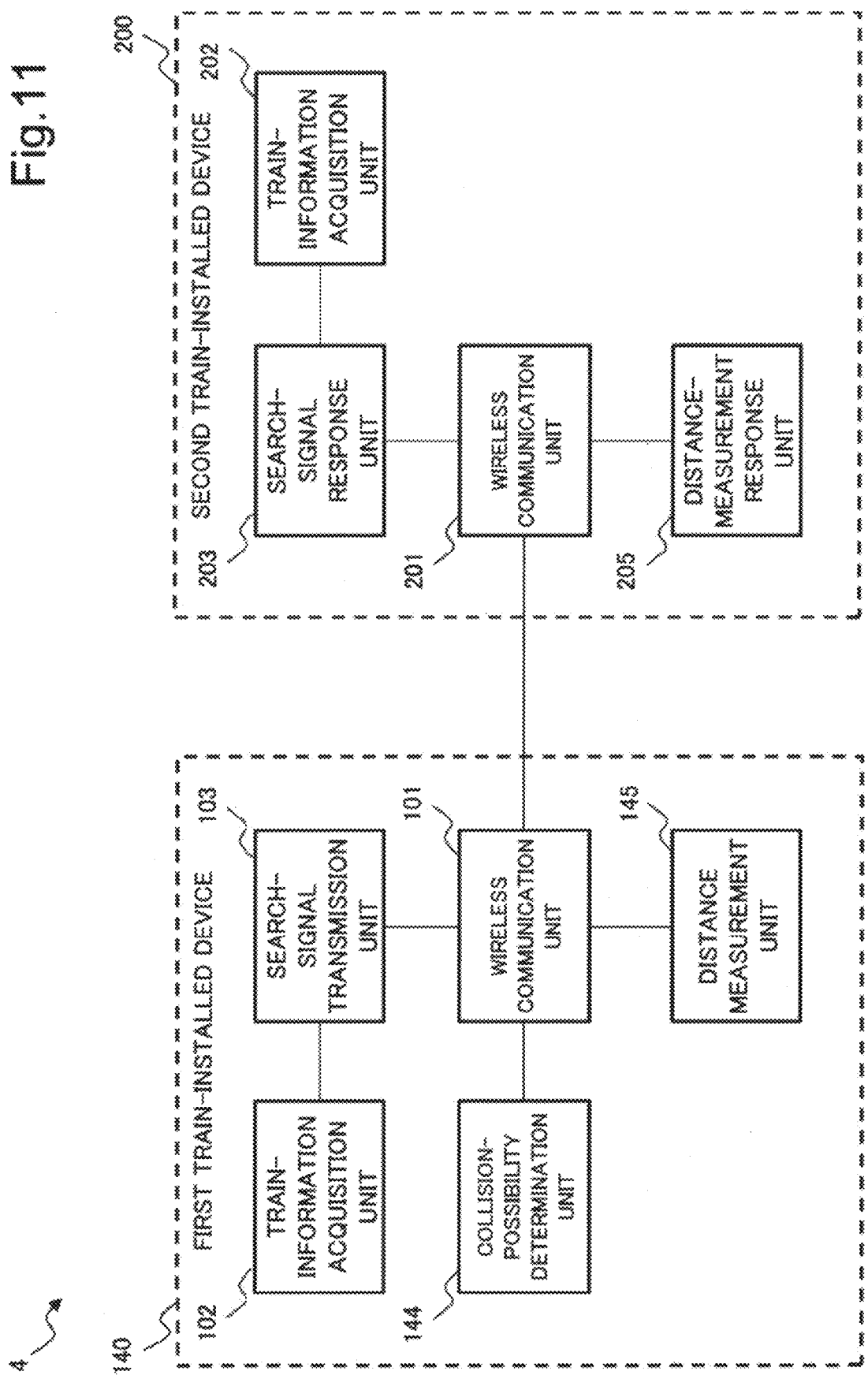
FIG. 11 is a block diagram illustrating a configuration of a train collision-prevention system according to a fourth example embodiment of the present invention.

First, FIG. 11 illustrates a configuration of a train-collision prevention system 4 according to the fourth example embodiment of the present invention. In FIG. 11, the train-collision prevention system 4 differs from the train-collision prevention system 3 according to the third example embodiment of the present invention in including a first train-installed device 140 in place of the first train-installed device 100.

The first train-installed device 140 differs from the first train-installed device 100 in including a collision-possibility determination unit 144 in place of the collision-possibility determination unit 104 and a distance measurement unit 145 in place of the distance measurement unit 105.

The train-collision prevention system 4 may be configured with hardware elements similar to those in the train-collision prevention system 3 according to the third example embodiment of the present invention described with reference to FIGS. 2 and 5. Note that the hardware configurations of the train-collision prevention system 4 and each functional block in the train-collision prevention system 4 are not limited to the configurations described above.

Next, out of functional blocks of the train-collision prevention system 4, functional blocks different from those according to the first to third example embodiments of the present invention will be described in detail.

The collision-possibility determination unit 144 is configured almost similarly to the collision-possibility determination unit 104 according to the first example embodiment of the present invention but differs in the following. That is, when a plurality of response signals responding to the same search signal are received through a wireless communication unit 101, the collision-possibility determination unit 144 determines a possibility of a collision with priority given to a response signal received earlier. Specifically, the collision-possibility determination unit 144 determines a possibility of a collision in order of reception of a response signal. Then, the collision-possibility determination unit 144 notifies the distance measurement unit 145 to perform processing on the first response signal determined to have a possibility of a collision. The collision-possibility determination unit 144 does not need to determine a possibility of a collision with respect to a response signal received after the relevant response signal.

The distance measurement unit 145 is configured almost similarly to the distance measurement unit 105 according to the first example embodiment of the present invention but differs in the following. That is, with respect to a response signal being received earlier and being determined to have a possibility of a collision, the distance measurement unit 145 measures a distance from a train equipped with the source of the response signal. With respect to a response signal received after the relevant response signal, the distance measurement unit 145 does not execute processing of measuring a distance.

An operation of the train-collision prevention system 4 configured as described above will be described with reference to drawings.

Figure 12:
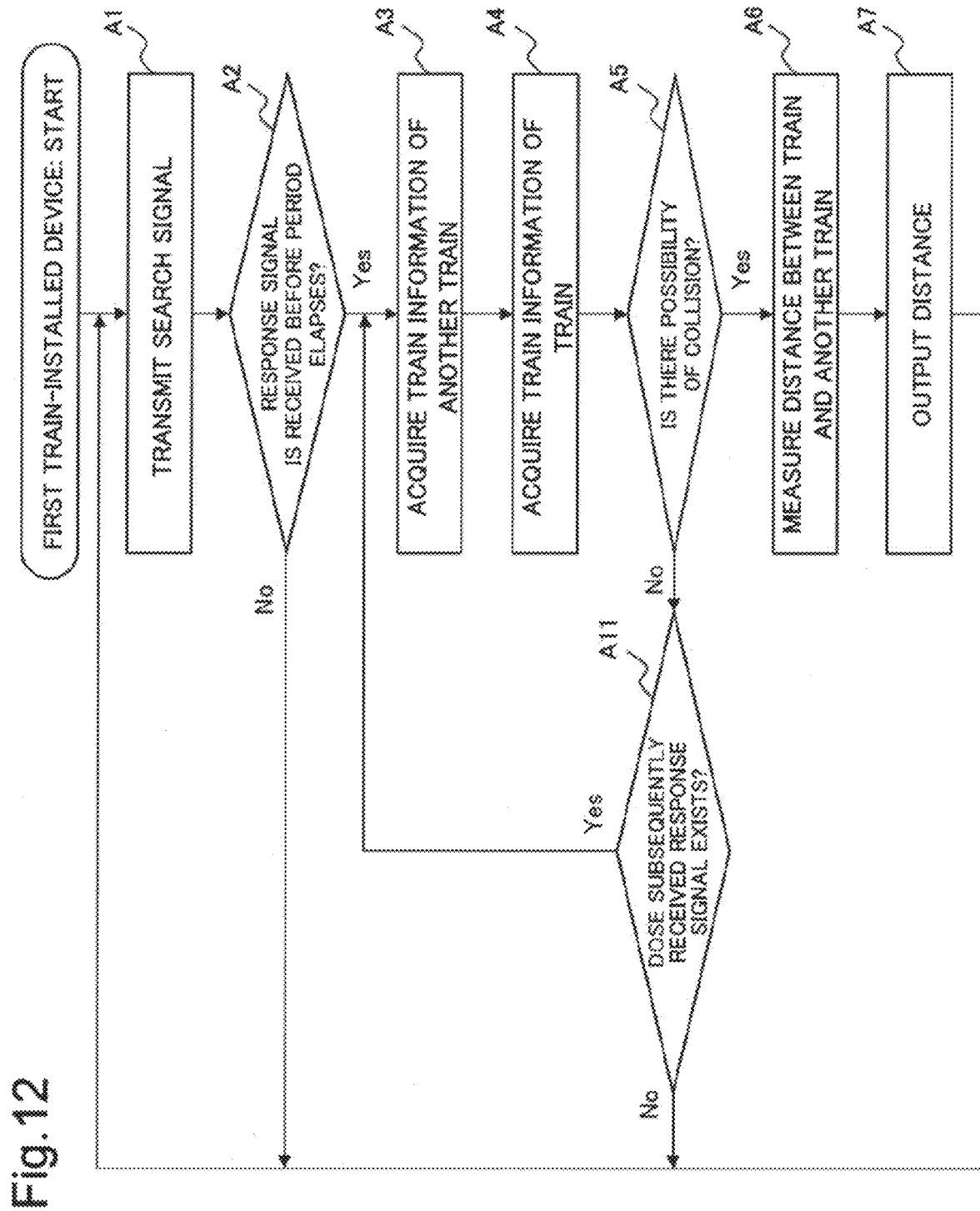
FIG. 12 is a flowchart illustrating an operation of a first train-installed device according to the fourth example embodiment of the present invention.

First, FIG. 12 illustrates an operation of the first train-installed device 140.

In FIG. 12, the first train-installed device 140 operates almost similarly to the first train-installed device 100 according to the first example embodiment of the present invention described with reference to FIG. 3. However, there is a difference as follows.

When determining that there is no possibility of a collision in Step A5, the collision-possibility determination unit 144 determines whether or not a response signal subsequently received in response to the search signal transmitted in Step A1 exists (Step A11).

Then, when a subsequently received response signal exists (Yes in Step A11), the collision-possibility determination unit 144 acquires train information of another train included in the response signal (Step A3). Then, the first train-installed device 140 executes the operation from Step A4.

On the other hand, when a subsequently received response signal does not exist (No in Step A11), the first train-installed device 140 repeats the operation from Step A1.

Further, when determining that there is a possibility of a collision in Step A5, the distance measurement unit 145 executes Steps A6 and A7, similarly to the first example embodiment of the present invention, and measures a distance between the train and another train, and outputs the distance.

Thus, when receiving a plurality of response signals responding to the same search signal, the first train-installed device 140 measures a distance from a train equipped with the source of a first response signal determined to have a possibility of a collision, out of the plurality of response signals. Then, the first train-installed device 140 does not perform processing based on a response signal received thereafter.

The above concludes the description of the operation of the first train-installed device 140.

Next, an operation of the train-collision prevention system 4 will be described with a sequence diagram in FIG. 13.

Figure 13:
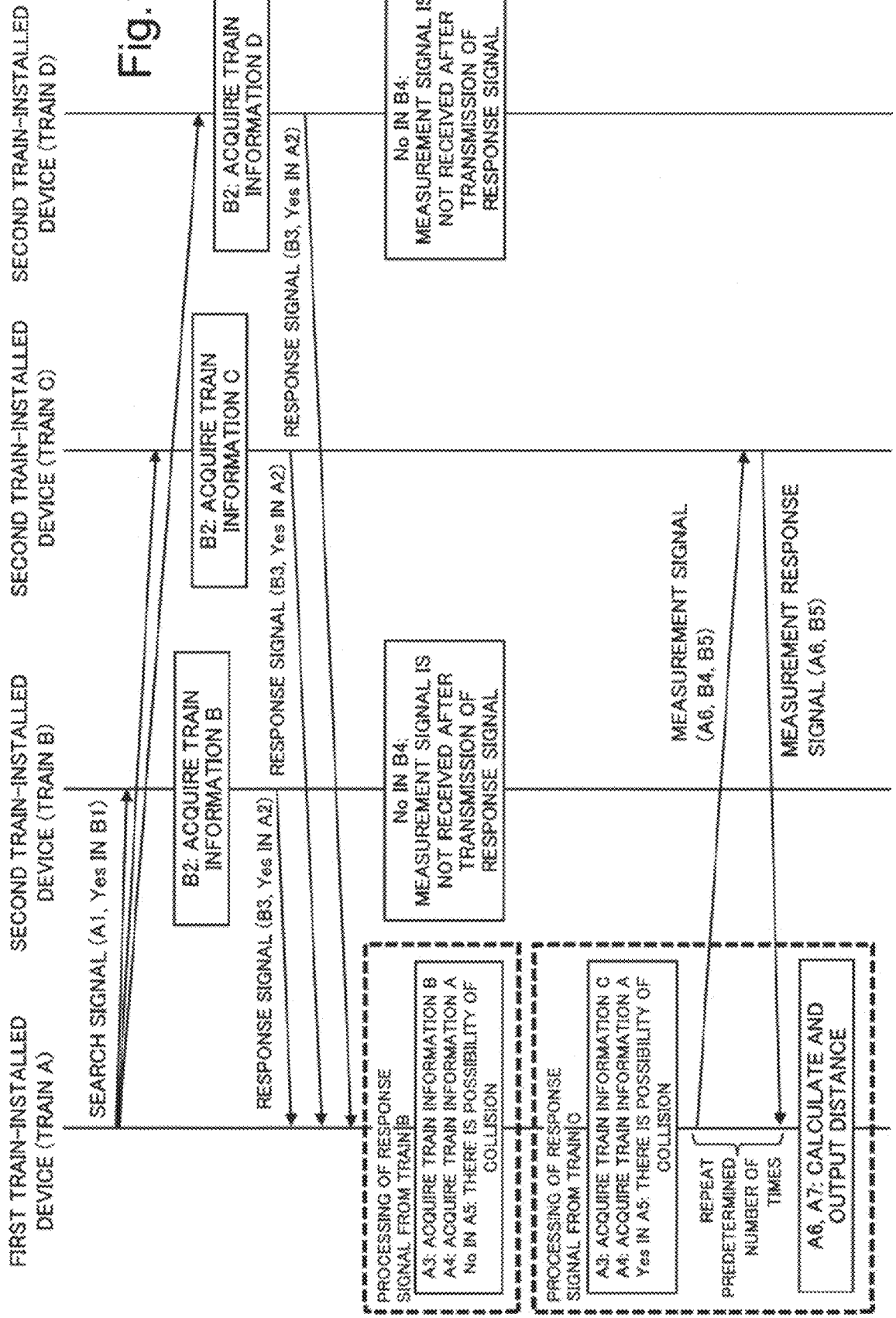
FIG. 13 is a sequence diagram illustrating an operation of the train collision-prevention system according to the fourth example embodiment of the present invention.

It is assumed in FIG. 13 that a train A equipped with the first train-installed device 140, and trains B, C, and D each of which is equipped with the second train-installed device 200 exist within an inter-communicable range. It is further assumed that the trains A and C run on the same railroad. It is further assumed that the train A runs behind, and the train C runs ahead. It is further assumed that each of the trains B and D is on-rail on a railroad different from the railroad on which the train A is on-rail.

In FIG. 13, first, in the first train-installed device 140 on the train A, the search-signal transmission unit 103 transmits a search signal (Step A1). Then, in each of the second train-installed devices 200 on the trains B, C, and D, the search-signal response unit 203 receives the search signal (Yes in Step B1).

Next, in each of the second train-installed devices 200 on the trains B, C, and D, the search-signal response unit 203 acquires train information B of the train B, train information C of the train C, or train information D of the train D, by using the train-information acquisition unit 202 (Step B2).

Next, in each of the second train-installed devices 200 on the trains B, C, and D, the search-signal response unit 203 includes the acquired train information B, train information C, or train information D in a response signal, and transmits the response signal to the first train-installed device 140 on the train A (Step B3).

Next, in the first train-installed device 140 on the train A, the collision-possibility determination unit 144 determines that response signals from the second train-installed devices 200 on the trains B, C, and D are respectively received in this order (Yes in Step A2).

Next, in the first train-installed device 140 on the train A, the collision-possibility determination unit 144 acquires the train information B included in the response signal received first (Step A3).

Further, the collision-possibility determination unit 144 acquires train information A of the train A by using the train-information acquisition unit 102 (Step A4).

In this case, the train information A and the train information B indicate different railroads. Accordingly, the collision-possibility determination unit 144 determines that there is no possibility of a collision between the trains A and B (No in Step A5).

Then, since a subsequently received response signal exists (Yes in Step A11), the collision-possibility determination unit 144 acquires train information C included in the subsequently received response signal (Step A3).

Further, the collision-possibility determination unit 144 acquires the train information A of the train A by using the train-information acquisition unit 102 (Step A4).

In this case, the train information A and the train information C indicate the same railroad. Accordingly, the collision-possibility determination unit 144 determines that there is a possibility of a collision between the trains A and C (Yes in Step A5).

Then, the distance measurement unit 145 measures a distance between the trains A and C by transmitting and receiving a measurement signal and a measurement response signal for the measurement signal, to and from the second train-installed device 200 on the train C, and outputs the distance (Step A6, A7).

Then, the distance measurement unit 145 does not perform processing on a response signal received thereafter from the second train-installed device 200 on the train D.

Further, each of the second train-installed devices 200 on the trains B and D does not receive a measurement signal before a predetermined period elapses after transmission of a response signal (No in Step B4) and therefore waits for reception of a next search signal.

Thus, the train-collision prevention system 4 measures a distance from a train based on the response signal which is firstly determined to have a possibility of a collision, out of a plurality of response signals received in response to the same search signal, and does not perform processing on a response signal received thereafter.

Next, an effect of the fourth example embodiment of the present invention will be described.

The train-collision prevention system according to the fourth example embodiment of the present invention can efficiently execute processing of acquiring more suitable information for preventing a collision between trains while holding down an installation cost and a maintenance cost, even when trains are assumed to run on a plurality of railroads.

The reason will be described. According to the present example embodiment, when a plurality of response signals responding to the same search signal are received through the wireless communication unit in the first train-installed device, the collision-possibility determination unit determines a possibility of a collision with priority given to a response signal received earlier. Then, with respect to the response signal being received earlier and being determined to have a possibility of a collision, the distance measurement unit measures a distance from a train equipped with the second train-installed device being the source of the response signal.

A collision of trains occurs on the same railroad. Accordingly, a plurality of trains having a possibility of a collision do not exist in front of a given train. Accordingly, even when receiving a response signal from each of a plurality of the second train-installed devices existing within a communicable range, the first train-installed device may perform processing on a response signal determined to have a possibility of a collision earlier, and processing on the remaining response signals becomes unnecessary. Thus, the present example embodiment improves processing efficiency by omitting unnecessary processing.

Fifth Example Embodiment

Next, a fifth example embodiment of the present invention will be described in detail with reference to drawings. Note that, in each drawing referred to in the description of the present example embodiment, the same configuration as and a step operating similarly to those according to the first to fourth example embodiments of the present invention are given the same signs, and detailed description in the present example embodiment is omitted.

Figure 14:
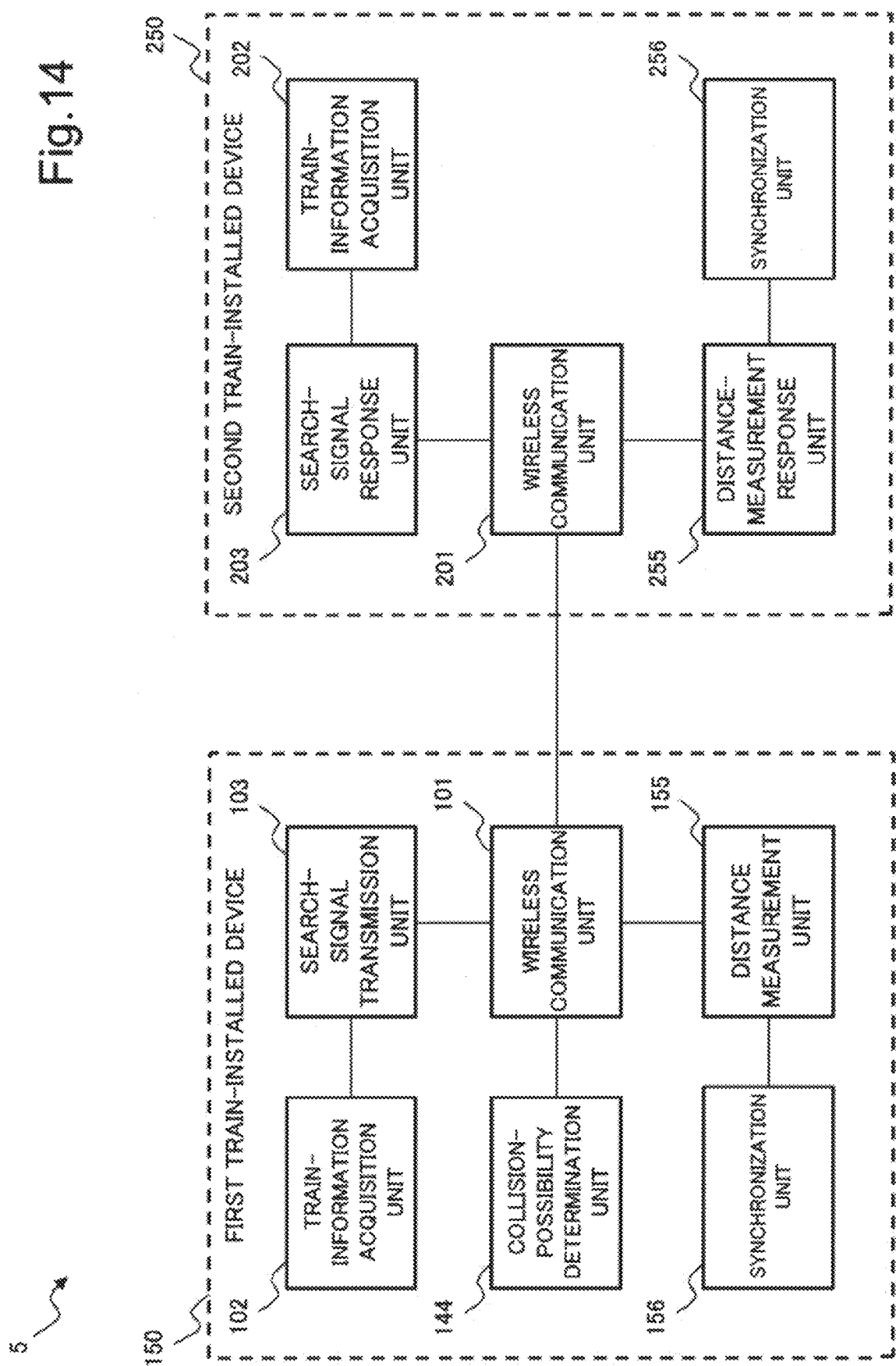
FIG. 14 is a block diagram illustrating a configuration of a train collision-prevention system according to a fifth example embodiment of the present invention.

First, FIG. 14 illustrates a configuration of a train-collision prevention system 5 according to the fifth example embodiment of the present invention. In FIG. 14, the train-collision prevention system 5 differs from the train-collision prevention system 4 according to the fourth example embodiment of the present invention in including a first train-installed device 150 in place of the first train-installed device 140. The train-collision prevention system 5 further differs in including a second train-installed device 250 in place of the second train-installed device 200. Further, the first train-installed device 150 differs from the first train-installed device 140 in including a distance measurement unit 155 in place of the distance measurement unit 145 and further including a synchronization unit 156. Further, the second train-installed device 250 differs from the second train-installed device 200 in including a distance-measurement response unit 255 in place of the distance-measurement response unit 205 and further including a synchronization unit 256.

Figure 15:
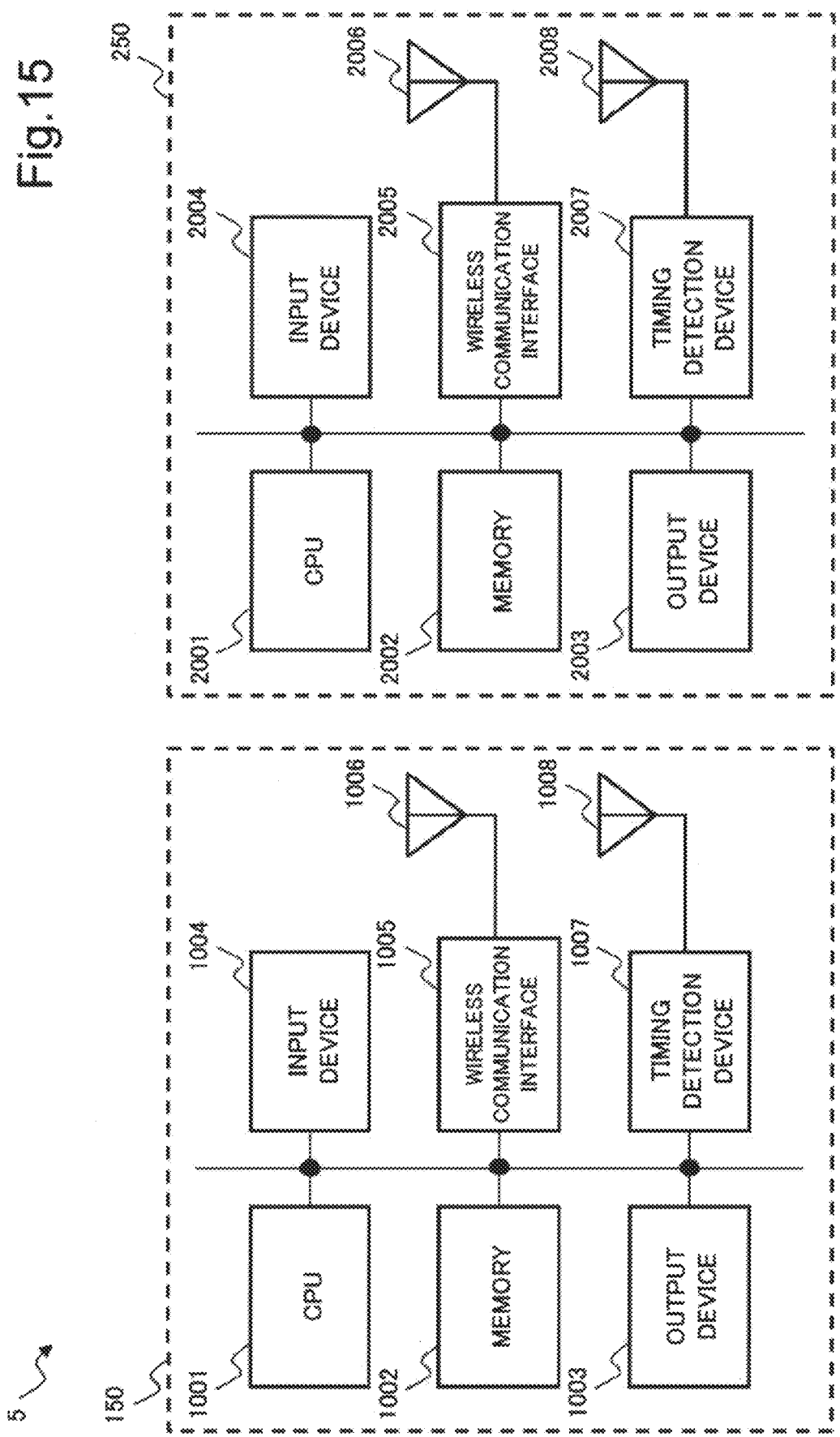
FIG. 15 is a diagram illustrating a hardware configuration example of the train-collision prevention system according to the fifth example embodiment of the present invention.

FIG. 15 illustrates a hardware configuration example of the train-collision prevention system 5. In FIG. 15, the first train-installed device 150 is configured to include a timing detection device 1007 and an antenna 1008 in addition to hardware elements similar to those in the first train-installed device 100 described with reference to FIG. 2. Further, the second train-installed device 250 is configured to include a timing detection device 2007 and an antenna 2008 in addition to hardware elements similar to those in the second train-installed device 200 described with reference to FIG. 5. The antennas 1008 and 2008 receive radio waves indicating a timing, convert the radio waves into signals, and outputs the signals. The timing detection devices 1007 and 2007 respectively receive the signals output from the antennas 1008 and 2008 as timing signals. For example, the antennas 1008 and 2008 may be Global Positioning System (GPS) antennas. In that case, a pulse per second (PPS) signal is applicable as the signal indicating a timing. In this case, the synchronization unit 156 is configured with the timing detection device 1007, the antenna 1008, and a CPU 1001 reading and executing a computer program stored in a memory 1002. Further, the synchronization unit 256 is configured with the timing detection device 2007, the antenna 2008, and a CPU 2001 reading and executing a computer program stored in a memory 2002. Note that the hardware configurations of the train-collision prevention system 5 and each functional block in the train-collision prevention system 5 are not limited to the configurations described above.

Next, out of functional blocks in the train-collision prevention system 5, functional blocks different from those according to the fourth example embodiment of the present invention will be described in detail.

The synchronization unit 156 in the first train-installed device 150 synchronizes a timing signal used in the first train-installed device with a predetermined timing signal with which a timing signal used in the second train-installed device 250 is synchronized. For example, the predetermined timing may be a timing based on a signal received through the antenna 1008. For example, when the antenna 1008 is a GPS antenna, the synchronization unit 156 may receive a PPS signal from the GPS by the antenna 1008 and synchronize a timing signal of the first train-installed device with a timing based on the PPS signal.

The synchronization unit 256 in the second train-installed device 250 synchronizes a timing signal used in the second train-installed device with a predetermined timing signal with which a timing signal used in the first train-installed device 150 is synchronized. For example, the predetermined timing may be a timing based on a signal received through the antenna 2008. For example, when the antenna 2008 is a GPS antenna, the synchronization unit 256 may receive a PPS signal from the GPS by the antenna 2008 and synchronize a timing signal of the second train-installed device with a timing based on the PPS signal.

As a result of each of the synchronization unit 156 and the synchronization unit 256 thus performing synchronization processing, timing signals used in the first train-installed device 150 and the second train-installed device 250, respectively, are synchronized with one another.

Note that the synchronization unit 156 and the synchronization unit 256 do not need to perform processing of synchronizing a timing signal with a predetermined timing while the train is running. For example, the synchronization unit 156 and the synchronization unit 256 may execute the processing of synchronizing a timing signal with a predetermined timing in an environment in which a reception-condition of a radio wave by the antenna 1008 or the antenna 2008 is excellent, such as the train being on standby at a depot or the like.

The distance measurement unit 155 in the first train-installed device 150 transmits a measurement signal to the second train-installed device 250 at a timing indicated by a timing signal of the first train-installed device. Further, the first train-installed device 150 measures a distance between the train and another train, based on a delay time included in a measurement response signal received from the second train-installed device 250. Note that a delay time indicates a time from transmission to reception of a measurement signal, and may be considered as a one-way communication time between trains.

When receiving a measurement signal from the first train-installed device 150, the distance-measurement response unit 255 in the second train-installed device 250 calculates a delay time, based on a reception timing of the measurement signal and a timing signal of the second train-installed device. Note that the second train-installed device 250 can acquire a transmission timing of the received measurement signal, based on the timing signal of the second train-installed device. The reason is that the timing signal of the second train-installed device and the timing signal of the first train-installed device 150 are synchronized. Then, the distance-measurement response unit 255 includes the calculated delay time in a measurement response signal, and transmits the measurement response signal to the first train-installed device 150 being the source of the measurement signal. Further, the distance-measurement response unit 255 may include a train ID in a measurement response signal, in addition to a delay time.

Figure 16:
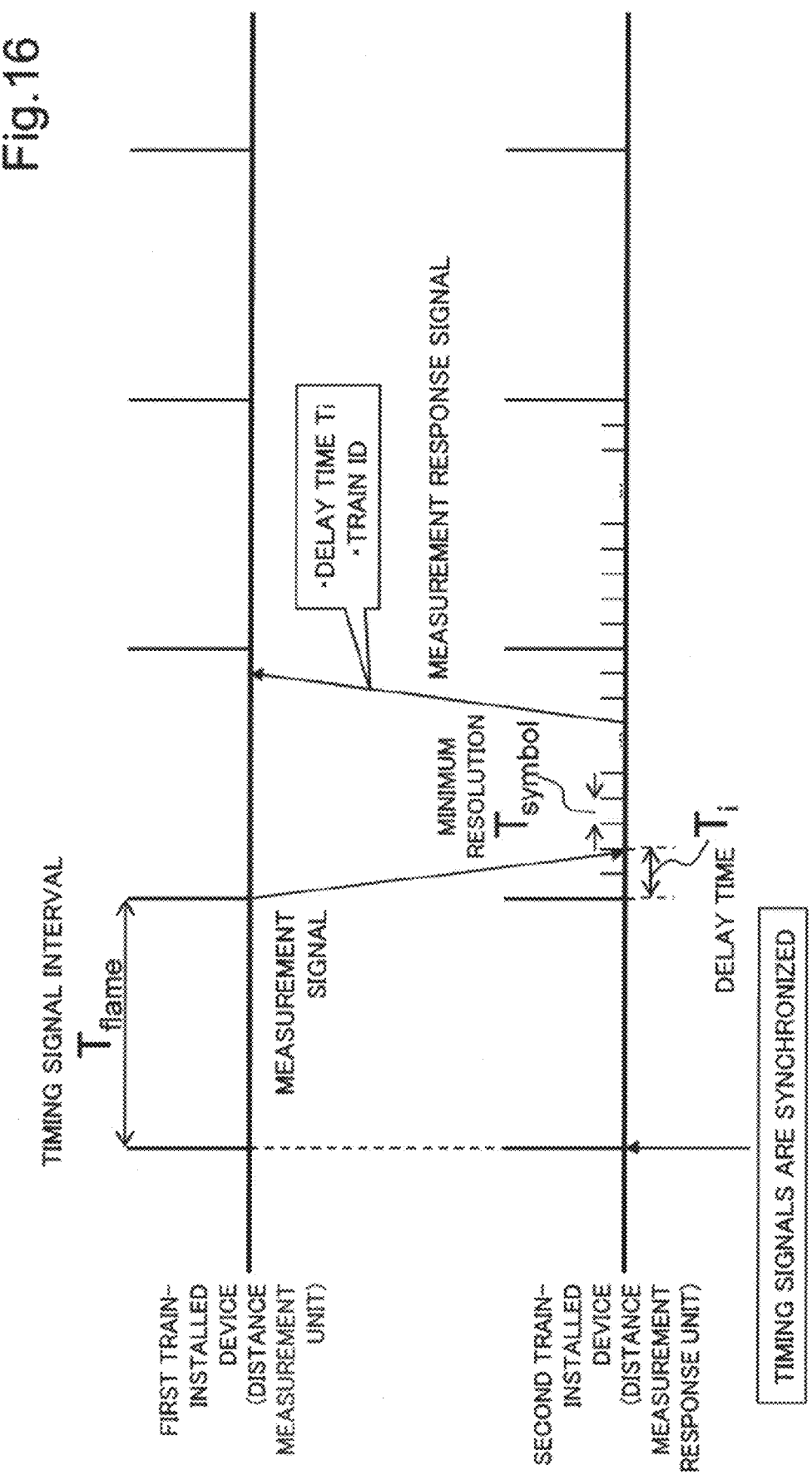
FIG. 16 is a schematic diagram illustrating distance measurement according to the fifth example embodiment of the present invention.

Details of a distance measurement technique by such a distance measurement unit 155 and such a distance-measurement response unit 255 will be described by using FIG. 16. FIG. 16 illustrates a time-graph of intercommunication by the distance measurement unit 155 in the first train-installed device 150 and the distance-measurement response unit 255 in the second train-installed device 250.

In FIG. 16, when a measurement signal is transmitted from the distance measurement unit 155 to the distance-measurement response unit 255, a time lag occurs between transmission and reception timings of the measurement signal due to a distance between trains. The delay time of this is denoted as $T_i$. A compensable minimum resolution exists in the timing signal used in each of the first train-installed device 150 and the second train-installed device 250. A value of the minimum resolution is denoted as $T_{symbol}$. FIG. 16 illustrates an example of $T_i = 2 \times T_{symbol}$. When receiving a measurement signal, the distance-measurement response unit 255 calculates the delay time $T_i$. Specifically, a timing of transmission of a measurement signal by the distance measurement unit 155 is based on a timing signal of the first train-installed device 150. Accordingly, the distance-measurement response unit 255 can calculate the delay time $T_i$ from a timing signal of the second train-installed device synchronized with the timing signal of the first train-installed device 150 and a timing of reception of the measurement signal. Then, the distance-measurement response unit 255 returns a measurement response signal including the delay time $T_i$ and a train ID to the first train-installed device 150 being the source of the measurement signal. The distance measurement unit 155 may calculate a distance between a train indicated by the train ID and the train equipped with the first train-installed device, based on the delay time $T_i$ included in the measurement response signal.

Note that the distance measurement unit 155 may transmit a measurement signal a predetermined number of times n (where n is a positive integer). In this case, the distance measurement unit 155 may calculate a distance between trains, based on n delay times $T_i$ included in n measurement response signals.

Note that it is also conceivable that intercommunication becomes impossible before a transmission count of a measurement signal by the distance measurement unit 155 reaches n, due to running of trains respectively equipped with the first train-installed device 150 and the second train-installed device 250. In that case, the distance measurement unit 155 may discontinue the processing of measuring a distance when a measurement response signal related to a transmitted measurement signal is not received before a predetermined period elapses after transmission of the measurement signal. Alternatively, in that case, the distance measurement unit 155 may calculate a distance between the trains, based on measurement signals and measurement response signals transmitted and received up to that point.

Considering performance of a common transmission-reception circuit, the aforementioned minimum resolution $T_{symbol}$ is expressed in units of microseconds ($10^{-6}$ seconds). Further, an interval of timing signals in the first train-installed device 150 and the second train-installed device 250 is denoted as $T_{flame}$, and it is assumed that $T_{flame}$ is expressed in units of milliseconds ($10^{-3}$ seconds). Assuming that $T_{symbol}=1$ microsecond, the time is converted approximately 300 meters in terms of distance, by using 299,792,458 meters per second which is the speed of light. In other words, under this assumption, a resolution of a distance between trains calculated by the distance measurement unit 155 is approximately 300 meters. This a performance that meets the 600-meter provision of the Japanese ministerial ordinance defining a technical standard related to railways, and accuracy within a radius of approximately 1 to 2 kilometers from an alarming point, the radius being set as a reachable range of a radio wave from a train protection wireless device.

That is, it is considered to perform stop control of stopping the train 600 meters in fr based on a distance between trains calculated by the present example embodiment. Further, as described above, it is assumed that a resolution of a calculable distance is 300 meters and also a reachable range of a radio wave is within 1 kilometer, according to the present example embodiment. In this case, initially, the present example embodiment first detects 1 kilometer as a distance from a train in front. Stop control can be performed on the train at this point. Furthermore, the present example embodiment next detects 700 meters as a distance from the same train in front. Second stop control can also be performed on the train at this point. Thus, redundancy may be provided for the stop control can be made redundant when the reachable range of a radio wave is within 1 kilometer and the resolution of a calculated distance is 300 meters.

Note that, when the aforementioned value is assumed as a minimum resolution, it is desirable that timing signals respectively used in the first train-installed device 150 and the second train-installed device 250 are synchronized with an error as described below. It is desirable that timing signals respectively used in the first train-installed device 150 and the second train-installed device 250 are synchronized at an error of, for example, several nanoseconds ($10^{-9}$ seconds), by considering an effect on distance calculation based on the minimum resolution.

An operation of the train-collision prevention system 5 configured as described above will be described with reference to drawings.

Figure 17:
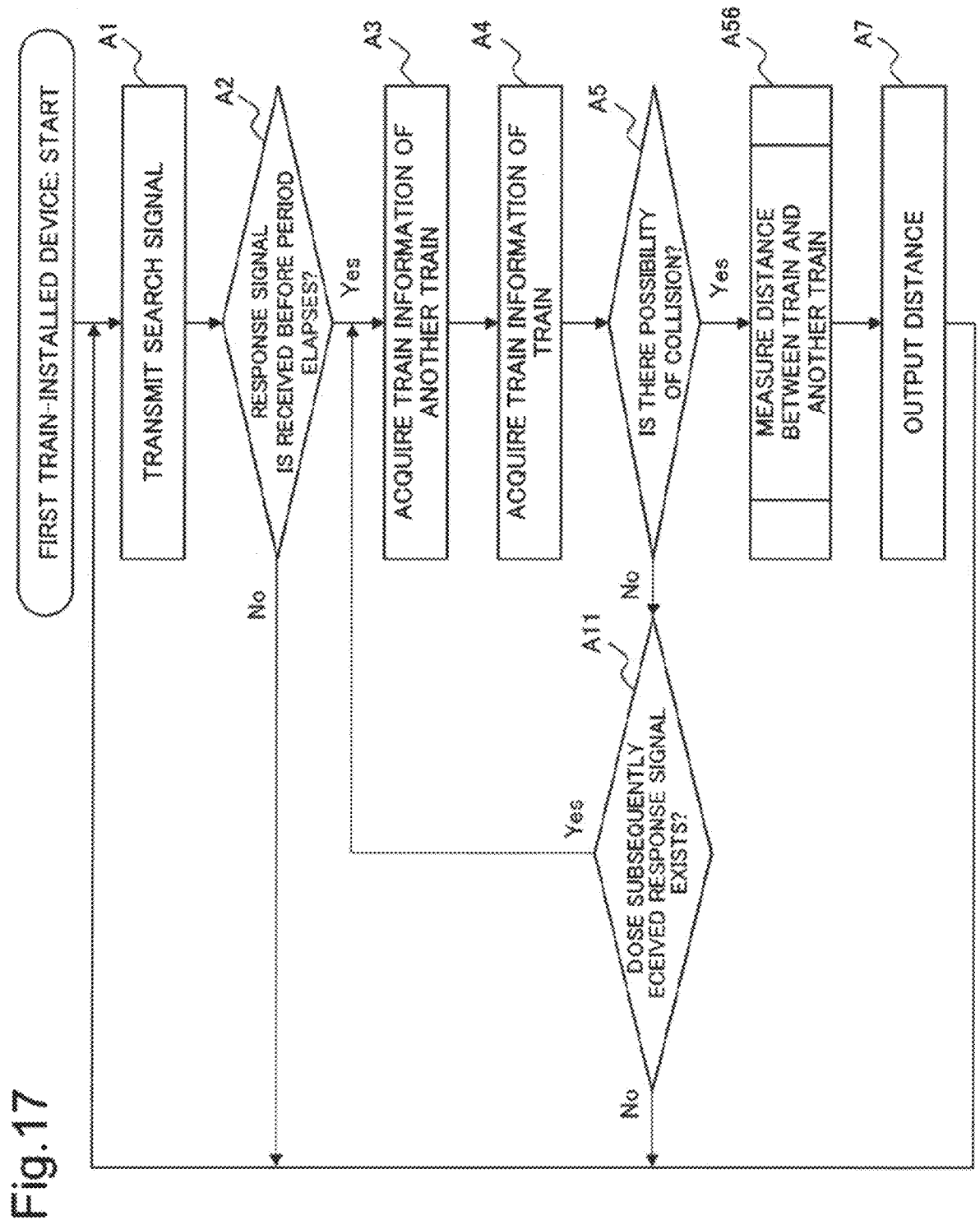
FIG. 17 is a flowchart illustrating an operation of a first train-installed device according to the fifth example embodiment of the present invention.
Figure 18:
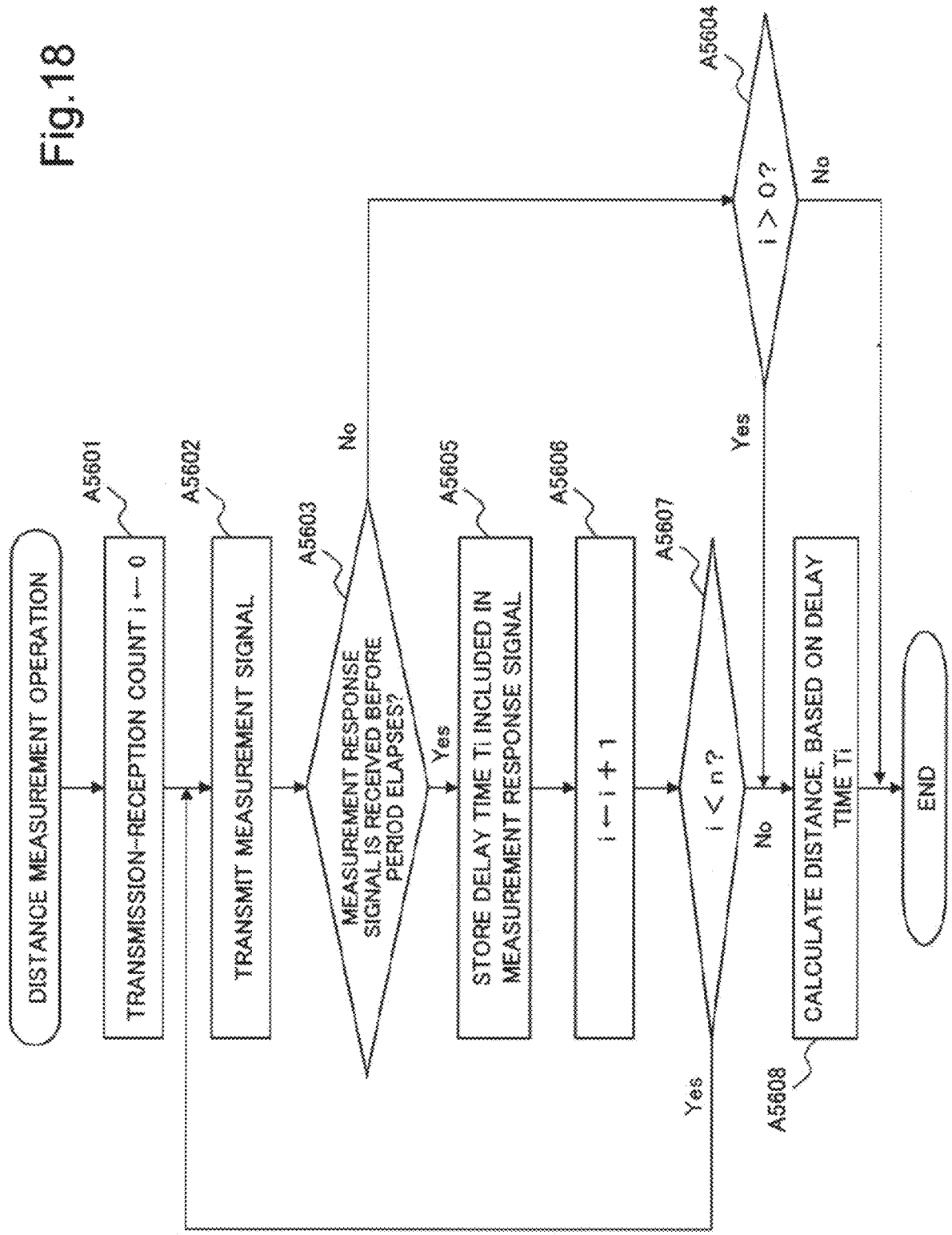
FIG. 18 is a flowchart illustrating details of an operation of measuring a distance by the first train-installed device according to the fifth example embodiment of the present invention.

First, FIG. 17 illustrates an operation of the first train-installed device 150. The operation illustrated in FIG. 17 is almost similar to that of the first train-installed device 140 according to the fourth example embodiment of the present invention described with reference to FIG. 12. However, execution of Step A56 in place of Step A6 as an operation of measuring a distance is different. FIG. 18 illustrates details of the operation in Step A56.

In FIG. 18, first, the distance measurement unit 155 sets a transmission-reception count i to 0 (Step A5601).

Next, the distance measurement unit 155 transmits a measurement signal to the second train-installed device 250 being the source of a response signal at a timing based on a timing signal (Step A5602). Information indicating the transmission-reception count i is included in the measurement signal.

Next, the distance measurement unit 155 determines whether or not a measurement response signal is received before a predetermined period elapses after transmitting the most recent measurement signal (Step A5603).

When a measurement response signal is not received before the predetermined period elapses (No in Step A5603), the operation of the first train-installed device 150 advances to Step A5604 to be described later.

On the other hand, when measurement response signal is received before the predetermined period elapses (Yes in Step A5603), the distance measurement unit 155 acquires a delay time $T_i$ from the received measurement response signal and temporarily stores the delay time (Step A5605).

Next, the distance measurement unit 155 adds 1 to the transmission-reception count i (Step A5606).

Then, when i is less than n (Yes in Step A5607), the distance measurement unit 155 repeats the processing from Step A5602.

On the other hand, when i reaches n (No in Step A5607), the distance measurement unit 155 calculates a distance between trains, based on the n temporarily stored delay times $T_i$ (Step A5608).

Note that one or more measurement response signals may have been already received even when a measurement response signal is no longer received before the transmission-reception count i reaches n (Yes in Step A5604). In this case, the distance measurement unit 155 calculates a distance between the trains by using one or more and less than n delay times $T_i$ stored up to that point (Step A5608).

The above concludes the operation of measuring a distance in Step A56 by the distance measurement unit 155.

Figure 19:
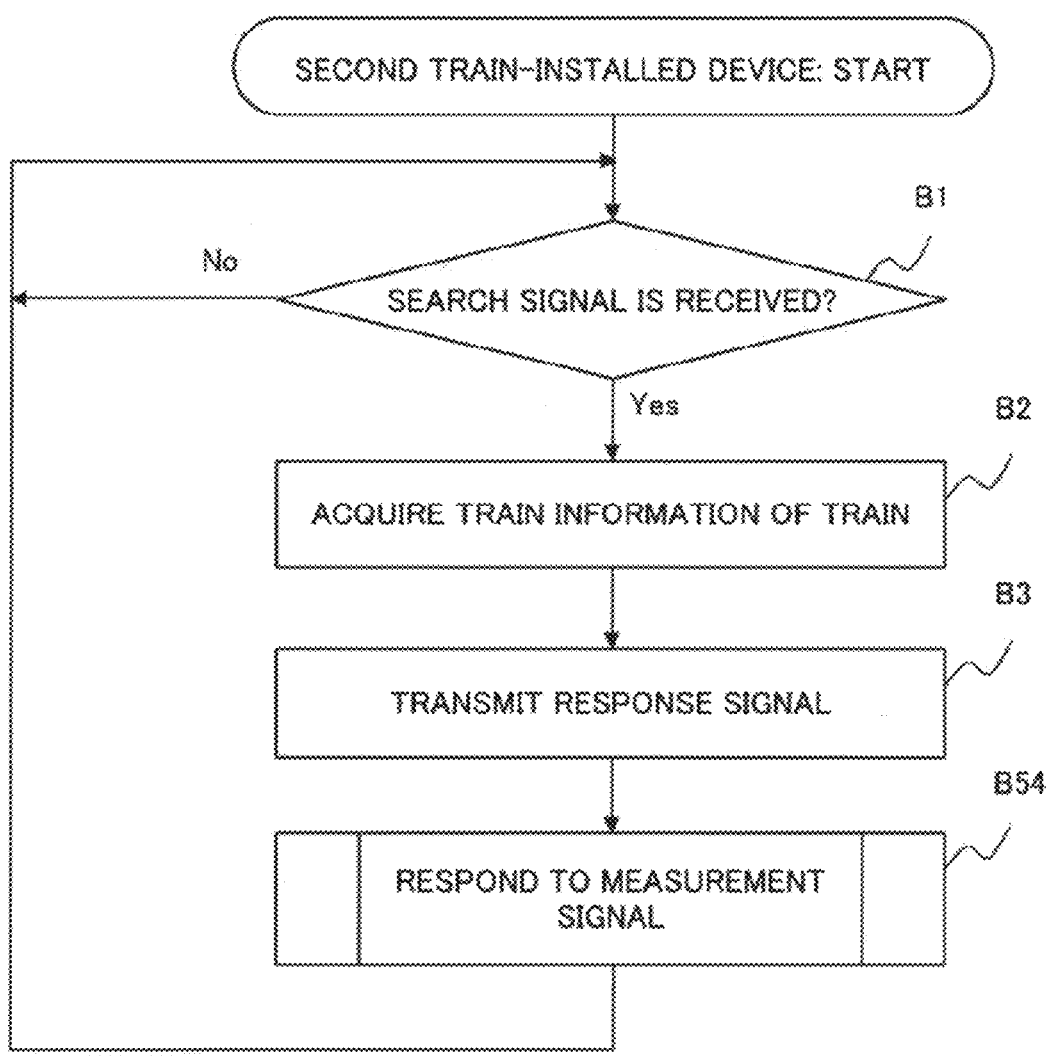
FIG. 19 is a flowchart illustrating an operation of a second train-installed device according to the fifth example embodiment of the present invention.
Figure 20:
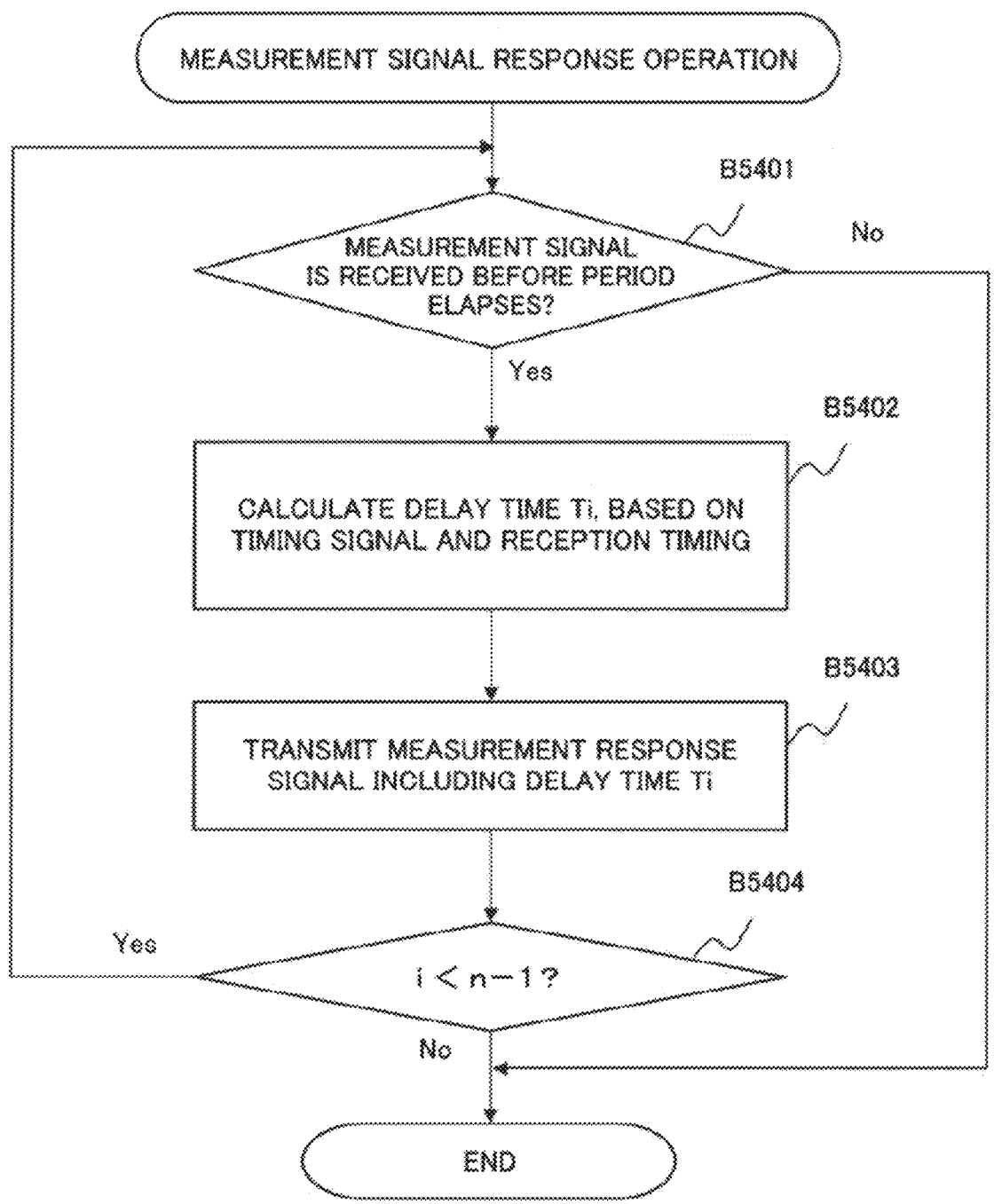
FIG. 20 is a flowchart illustrating details of an operation of responding to a measurement signal by the second train-installed device according to the fifth example embodiment of the present invention.

Next, FIG. 19 illustrates an operation of the second train-installed device 250. The operation illustrated in FIG. 19 is almost similar to that of the second train-installed device 200 according to the second example embodiment of the present invention described with reference to FIG. 6. However, execution of Step B54 in place of Steps B4 and B5 as an operation of responding to a measurement signal is different. FIG. 20 illustrates details of the operation in Step B54.

In FIG. 20, first, the distance-measurement response unit 255 determines whether or not a measurement signal is received before a predetermined period elapses after transmitting a response signal or a measurement response signal most recently (Step B5401).

When a measurement signal is not received before the predetermined period elapses (No in Step B5401), the distance-measurement response unit 255 ends the operation of responding to a measurement signal.

On the other hand, when a measurement signal is received before the predetermined period elapses (Yes in Step B5401), the distance-measurement response unit 255 calculates a delay time $T_i$, based on a timing signal of the second train-installed device and a reception timing of the measurement signal (Step B5402).

Next, the distance-measurement response unit 255 includes the delay time $T_i$ in a measurement response signal, and transmits the measurement response signal to the first train-installed device 150 being the source of the measurement signal (Step B5403).

Next, when i included in the received measurement signal is less than n−1 (Yes in Step B5404), the distance-measurement response unit 255 repeats the processing from Step B5401.

On the other hand, when i reaches n−1 (No in Step B5404), the distance-measurement response unit 255 ends the operation of responding to distance measurement.

The above concludes the operation of responding to a measurement signal by the distance-measurement response unit 255.

Next, an effect of the fifth example embodiment of the present invention will be described.

The train-collision prevention system according to the fifth example embodiment of the present invention can accurately calculate a distance between trains while holding down an installation cost and a maintenance cost, even when trains are assumed to run on a plurality of railroads.

The reason will be described. According to the present example embodiment, each synchronization unit in each of the first and second train-installed devices synchronizes a timing signal of each of the first and second train-installed devices with a predetermined timing signal, in addition to the same configuration as that according to the fourth example embodiment of the present invention. Further, in the first train-installed device, the distance measurement unit transmits a measurement signal at a timing indicated by the timing signal of the first train-installed device. Further, in the second train-installed device, the distance-measurement response unit calculates a delay time of a measurement signal, based on the timing signal of the second train-installed device and a reception timing of the measurement signal. Then, the distance-measurement response unit includes the calculated delay time in a measurement response signal, and transmits the measurement response signal to the first train-installed device. Then, in the first train-installed device, the distance measurement unit calculates a distance between trains, based on the delay time included in the received measurement response signal.

Thus, in the present example embodiment, in the first and second train-installed devices, each of the synchronization units synchronizes each timing signal with one another by previously synchronizing the timing signal with a predetermined timing signal during standby such as while at a depot. Herewith, the present example embodiment can accurately calculate a delay time between transmission and reception of a measurement signal, and improves accuracy of a distance calculated based on the delay time. Furthermore, when a measurement signal and a measurement response signal are transmitted and received a plurality of number of times, the present example embodiment calculates a distance, based on a delay time calculated the plurality of number of times, and therefore can further improve accuracy of the distance.

Note that, in the present example embodiment, an example in which each of the synchronization units equipped on the first and second train-installed devices synchronizes with a timing based on a PPS signal from the GPS is described. Without being limited to the above, the synchronization unit may synchronizes with a timing based on another signal that can be received from outside by both of the first and second train-installed devices.

Further, in the present example embodiment, an example in which the distance measurement unit in the first train-installed device calculates a distance between trains by considering a delay time included in a measurement response signal as a one-way communication time of a signal is described. Further, the distance measurement unit in the first train-installed device may calculate a delay time of a measurement response signal, and calculate a distance between trains based on a round-trip communication time of signals. At this time, the distance measurement unit in the first train-installed device may calculate a delay time of a measurement response signal, based on a timing signal of the first train-installed device, a reception timing of the measurement response signal, and a processing time in the second train-installed device. In this case, it is assumed that the processing time in the second train-installed device is previously notified.

Sixth Example Embodiment

Next, a sixth example embodiment of the present invention will be described in detail with reference to drawings. Note that, in each drawing referred to in the description of the present example embodiment, the same configuration as and a step operating similarly to those according to the first to third example embodiments of the present invention are given the same signs, and detailed description in the present example embodiment is omitted.

Figure 21:
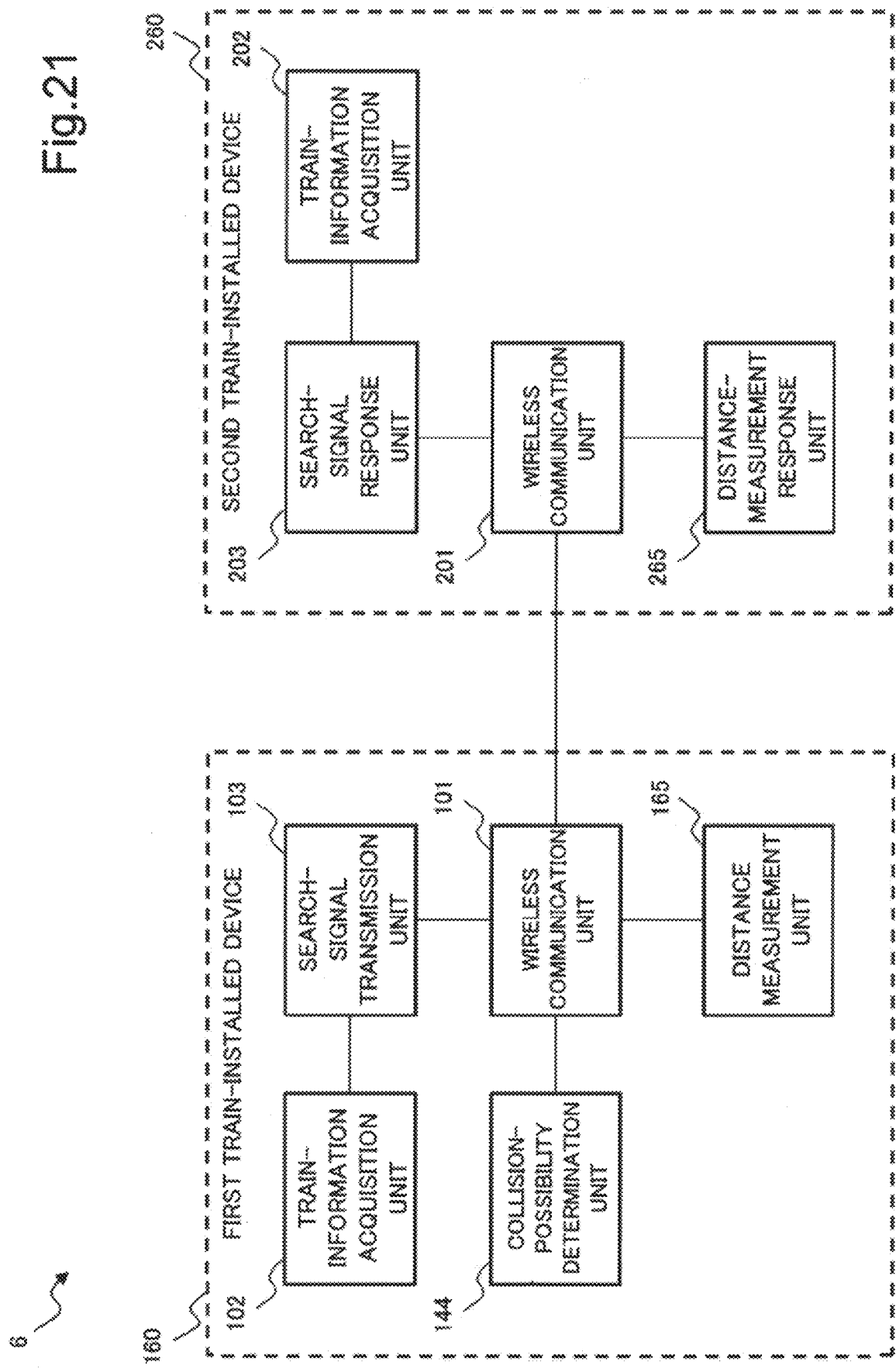
FIG. 21 is a block diagram illustrating a configuration of a train-collision prevention system according to a sixth example embodiment of the present invention.

First, FIG. 21 illustrates a configuration of a train-collision prevention system 6 according to the sixth example embodiment of the present invention. In FIG. 21, the train-collision prevention system 6 differs from the train-collision prevention system 4 according to the fourth example embodiment of the present invention in including a first train-installed device 160 in place of the first train-installed device 140. The train-collision prevention system 6 further differs in including a second train-installed device 260 in place of the second train-installed device 200.

The first train-installed device 160 differs from the first train-installed device 140 in including a distance measurement unit 165 in place of the distance measurement unit 145. Further, the second train-installed device 260 differs from the second train-installed device 200 in including a distance-measurement response unit 265 in place of the distance-measurement response unit 205.

The train-collision prevention system 6 may be configured with hardware elements similar to those in the train-collision prevention system 4 according to the fourth example embodiment of the present invention described with reference to FIGS. 2 and 5. Note that the hardware configurations of the train-collision prevention system 6 and each functional block in the train-collision prevention system 6 are not limited to the configurations described above.

Next, out of functional blocks in the train-collision prevention system 6, functional blocks different from those according to the fourth example embodiment of the present invention will be described in detail.

The distance measurement unit 165 in the first train-installed device 160 is configured almost similarly to the distance measurement unit 145 according to the fourth example embodiment of the present invention but differs in the following. That is, the distance measurement unit 165 measures a distance between trains by transmitting and receiving a measurement signal and a measurement response signal based on a start-stop synchronization method.

The distance-measurement response unit 265 in the second train-installed device 260 is configured almost similarly to the distance-measurement response unit 205 according to the fourth example embodiment of the present invention but differs in the following. That is, when receiving a measurement signal based on a start-stop synchronization method, the distance-measurement response unit 265 transmits a measurement response signal based on the start-stop synchronization method to the first train-installed device 160 being the source of the measurement signal.

Figure 22:
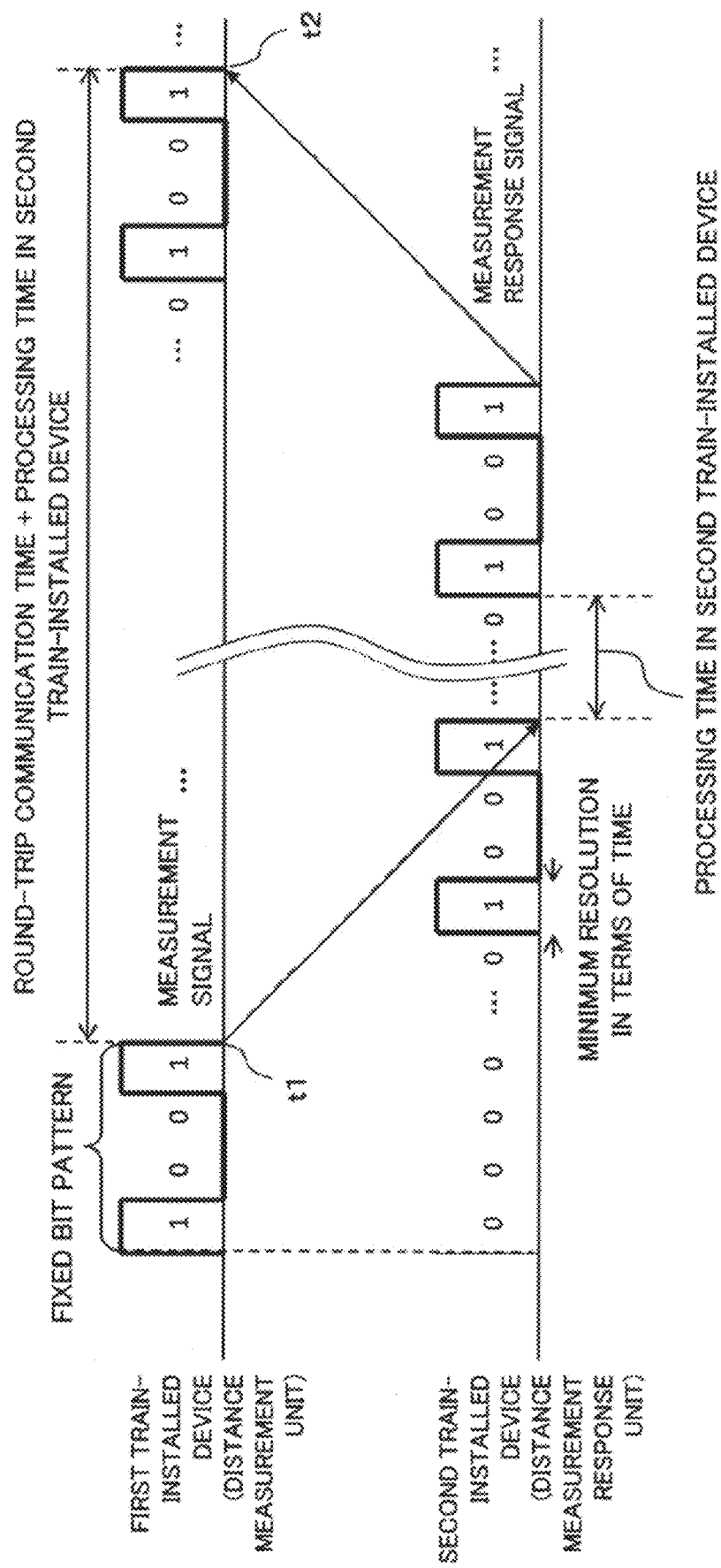
FIG. 22 is a schematic diagram illustrating distance measurement according to the sixth example embodiment of the present invention.

Details of a distance measurement technique by such a distance measurement unit 165 and such a distance-measurement response unit 265 will be described by using FIG. 22. FIG. 22 illustrates a time-graph of intercommunication by the distance measurement unit 165 in the first train-installed device 160 and the distance-measurement response unit 265 in the second train-installed device 260.

In this case, the distance measurement unit 165 adds a fixed bit pattern at the beginning of a measurement signal, and transmits the measurement signal to the second train-installed device 260. In the example in FIG. 22, the fixed bit pattern is "1001." Further, when there are no data to be transmitted, the distance measurement unit 165 always continues transmitting a stop bit. In the example in FIG. 22, the stop bit is "0." Further, after receiving the measurement signal transmitted from the first train-installed device 160, the distance-measurement response unit 265 adds a fixed pattern at the beginning of a measurement response signal, and transmits the measurement response signal to the first train-installed device 160. Then, the distance measurement unit 165 in the first train-installed device 160 detects the fixed bit pattern at the beginning of the measurement response signal transmitted from the second train-installed device 260.

At this time, in the first train-installed device 160, a timing after transmission of the fixed bit pattern added at the beginning of the measurement signal is denoted as t1. Further, a timing after detecting the fixed bit pattern added at the beginning of the measurement response signal is denoted as t2. A time from the timing t1 to the timing t2 is a total of a round-trip communication time of the measurement signal and the measurement response signal, and processing time from reception of the measurement signal to transmission of the measurement response signal in the second train-installed device 260. Note that it is assumed that the distance measurement unit 165 previously stores such a processing time in the second train-installed device 260. In this case, the distance measurement unit 165 in the first train-installed device 160 can calculate the round-trip communication time of the measurement signal and the measurement response signal by subtracting the processing time in the second train-installed device 260 from the difference between the timings t1 and t2. Then, the distance measurement unit 165 may calculate a distance between the trains, based on the determined round-trip communication time.

In this case, a minimum resolution of an acquirable round-trip time is expressed in units of bits, that is, depends on a clock frequency of the CPU 1001. For example, a clock frequency of a common CPU is expressed in units of gigahertz ($10^9$ hertz). In terms of time, this is the unit of nanosecond ($10^{-9}$ seconds). Further, in terms of distance by using the aforementioned speed of light, the minimum resolution is approximately 30 centimeters. In other words, when performing stop control of a train by using a distance between trains calculated by using the present example embodiment, the aforementioned ministerial ordinance and stop performance are sufficiently met.

An operation of the train-collision prevention system 6 configured as described above will be described with reference to drawings.

Figure 23:
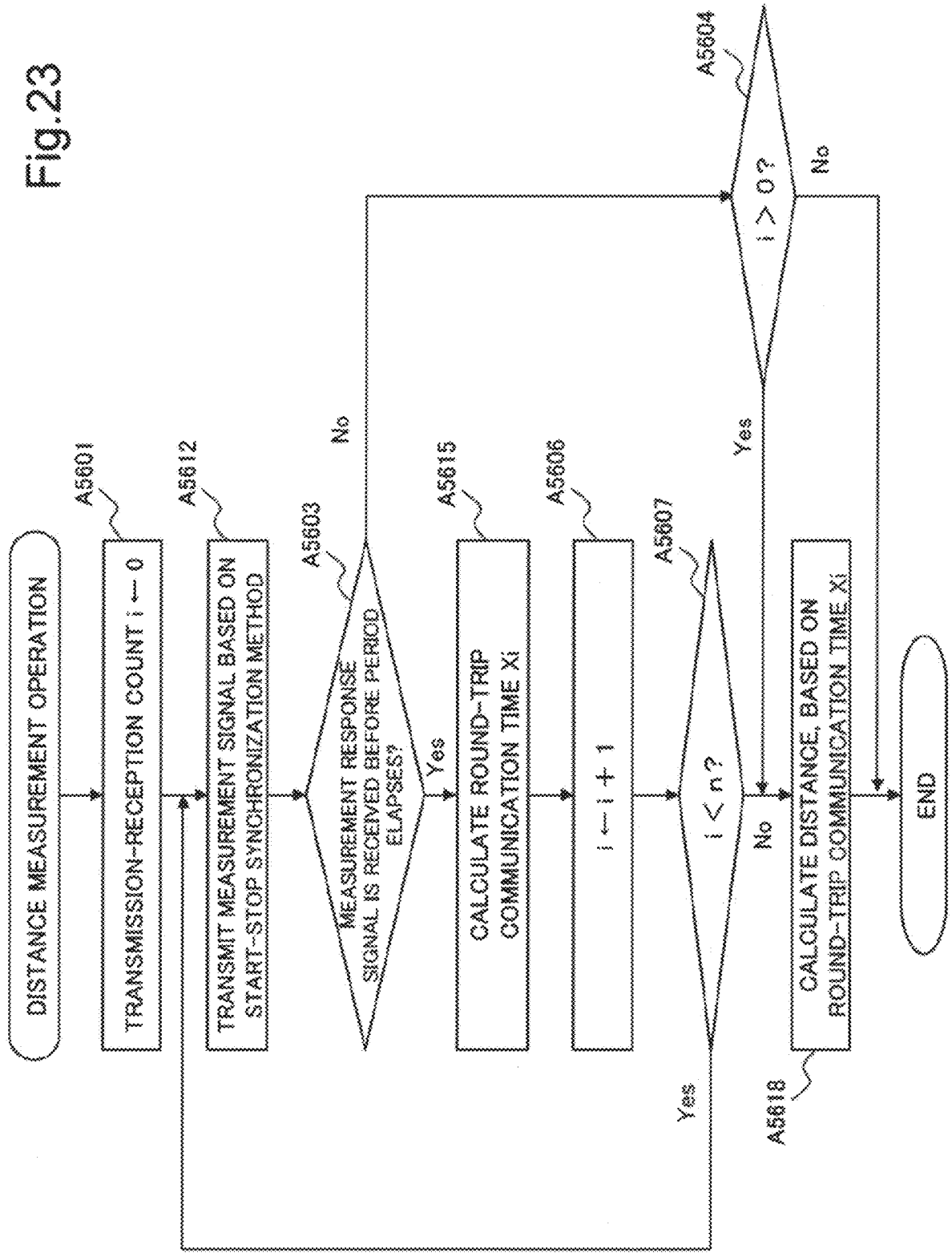
FIG. 23 is a flowchart illustrating details of an operation of measuring a distance by a first train-installed device according to the sixth example embodiment of the present invention.

First, an operation of the first train-installed device 160 will be described. The operation of the first train-installed device 160 is almost similar to that of the first train-installed device 150 according to the fifth example embodiment of the present invention described with reference to FIG. 17. However, details of the operation of measuring a distance in Step A56 is different. FIG. 23 illustrates the details of the operation in Step A56 according to the present example embodiment.

The operation in FIG. 23 is almost similar to the operation in Step A56 according to the fifth example embodiment of the present invention illustrated in FIG. 18. However, execution of Step A5612 in place of Step A5602, Step A5615 in place of Step A5605, and Step A5618 in place of Step A5608 is different.

In Step A5612, the distance measurement unit 165 transmits a measurement signal based on a start-stop synchronization method to the second train-installed device 260. Specifically, the distance measurement unit 165 may transmit a measurement signal added with a fixed bit pattern at the beginning.

In Step A5615, the distance measurement unit 165 calculates a round-trip communication time Xi of a measurement signal and a measurement response signal. For example, as described above, the distance measurement unit 165 calculates a round-trip communication time from the following times. The times are a timing t1 after transmission of the fixed bit pattern at the beginning of the measurement signal, a timing t2 after detection of a fixed bit pattern at the beginning of the measurement response signal, and a processing time in the second train-installed device 260.

Further, in Step A5618, the distance measurement unit 165 calculates a distance between trains, based on one or more round-trip communication times Xi.

The above concludes the description of the operation of the first train-installed device 160.

Figure 24:
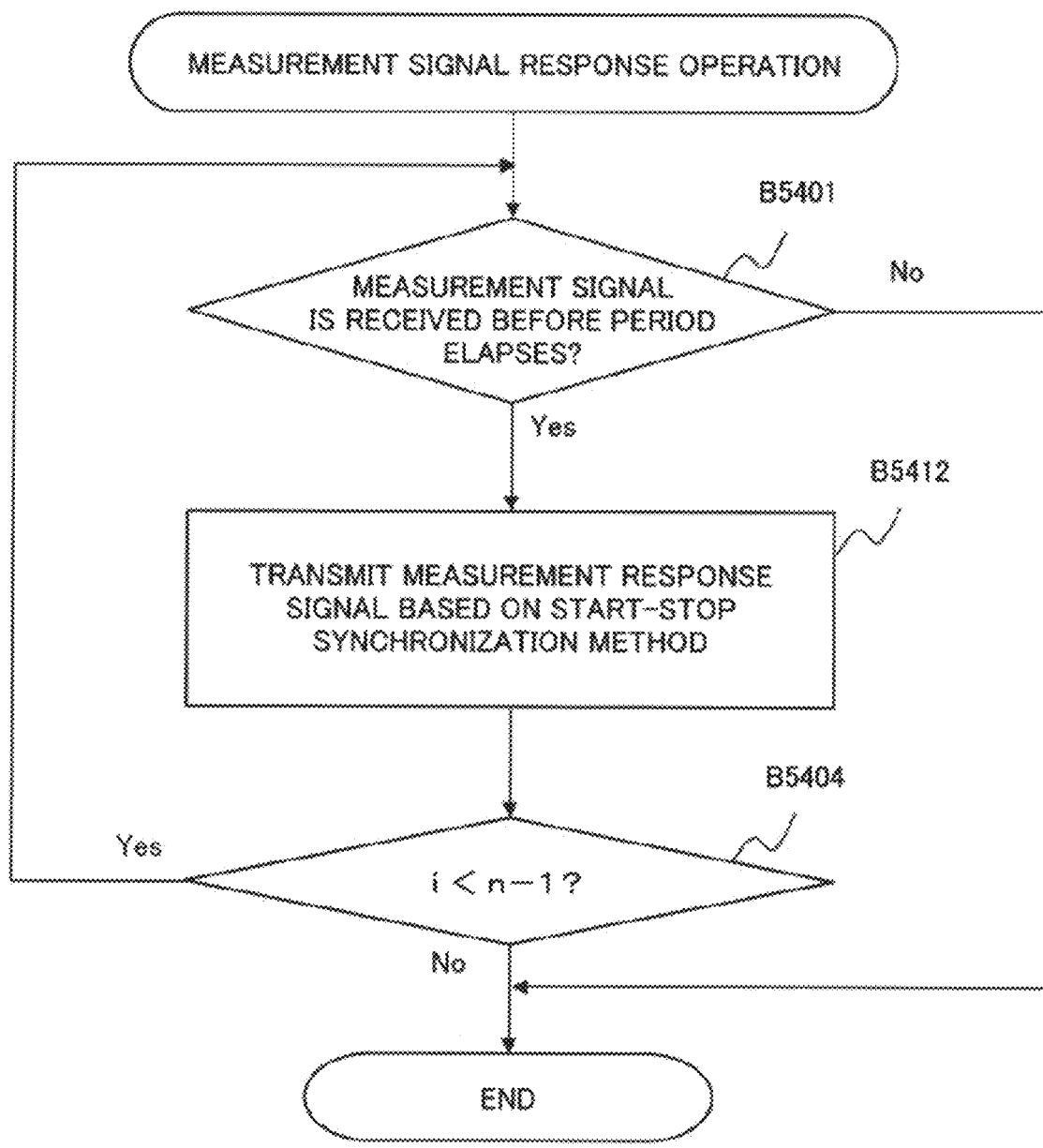
FIG. 24 is a flowchart illustrating details of an operation of responding to a measurement signal by a second train-installed device according to the sixth example embodiment of the present invention.

Next, an operation of the second train-installed device 260 will be described. The operation of the second train-installed device 260 is almost similar to that of the second train-installed device 250 according to the fifth example embodiment of the present invention described with reference to FIG. 19. However, details of the operation of responding to a measurement signal in Step B54 is different. FIG. 24 illustrates the details of the operation in Step B54 according to the present example embodiment.

The operation in FIG. 24 is almost similar to the operation in Step B54 according to the fifth example embodiment of the present invention illustrated in FIG. 20. However, execution of Step B5412 in place of Steps B5402 and B5403 is different.

In Step B5412, the distance-measurement response unit 265 transmits a measurement response signal based on a start-stop synchronization method to the first train-installed device 160. Specifically, the distance-measurement response unit 265 may transmit a measurement response signal added with a fixed bit pattern at the beginning.

The above concludes the operation of the second train-installed device 260.

Next, an effect of the sixth example embodiment of the present invention will be described.

The train-collision prevention system according to the sixth example embodiment of the present invention can calculate a distance between trains more accurately while holding down an installation cost and a maintenance cost, even when trains are assumed to run on a plurality of railroads.

The reason will be described. In the present example embodiment, the distance measurement unit in the first train-installed device and the distance-measurement response unit in the second train-installed device transmit and receive a measurement signal and a measurement response signal based on a start-stop synchronization method, in addition to the same configuration as that according to the fourth example embodiment of the present invention. Then, the distance measurement unit in the first train-installed device calculates a round-trip communication time based on transmission and reception timings of the measurement signal and the measurement response signal, and calculates a distance between trains based on the round-trip communication time.

Thus, compared with the fifth example embodiment of the present invention, the present example embodiment using a start-stop synchronization method can reduce a resolution of a distance, as described above, and improve accuracy of a calculated distance. Further, compared with the fifth example embodiment of the present invention, the present example embodiment using a start-stop synchronization method does not require a timing detection device and an antenna which acquire a predetermined timing, and further holds down an installation cost. Further, compared with the fifth example embodiment of the present invention, the present example embodiment using a start-stop synchronization method does not require a synchronization unit for synchronizing with a predetermined timing during standby, and can further hold down a maintenance cost.

Seventh Example Embodiment

Next, a seventh example embodiment of the present invention will be described in detail with reference to drawings. Note that, in each drawing referred to in the description of the present example embodiment, the same configuration as and a step operating similarly to those according to the first to sixth example embodiments of the present invention are given the same signs, and detailed description in the present example embodiment is omitted.

Figure 25:
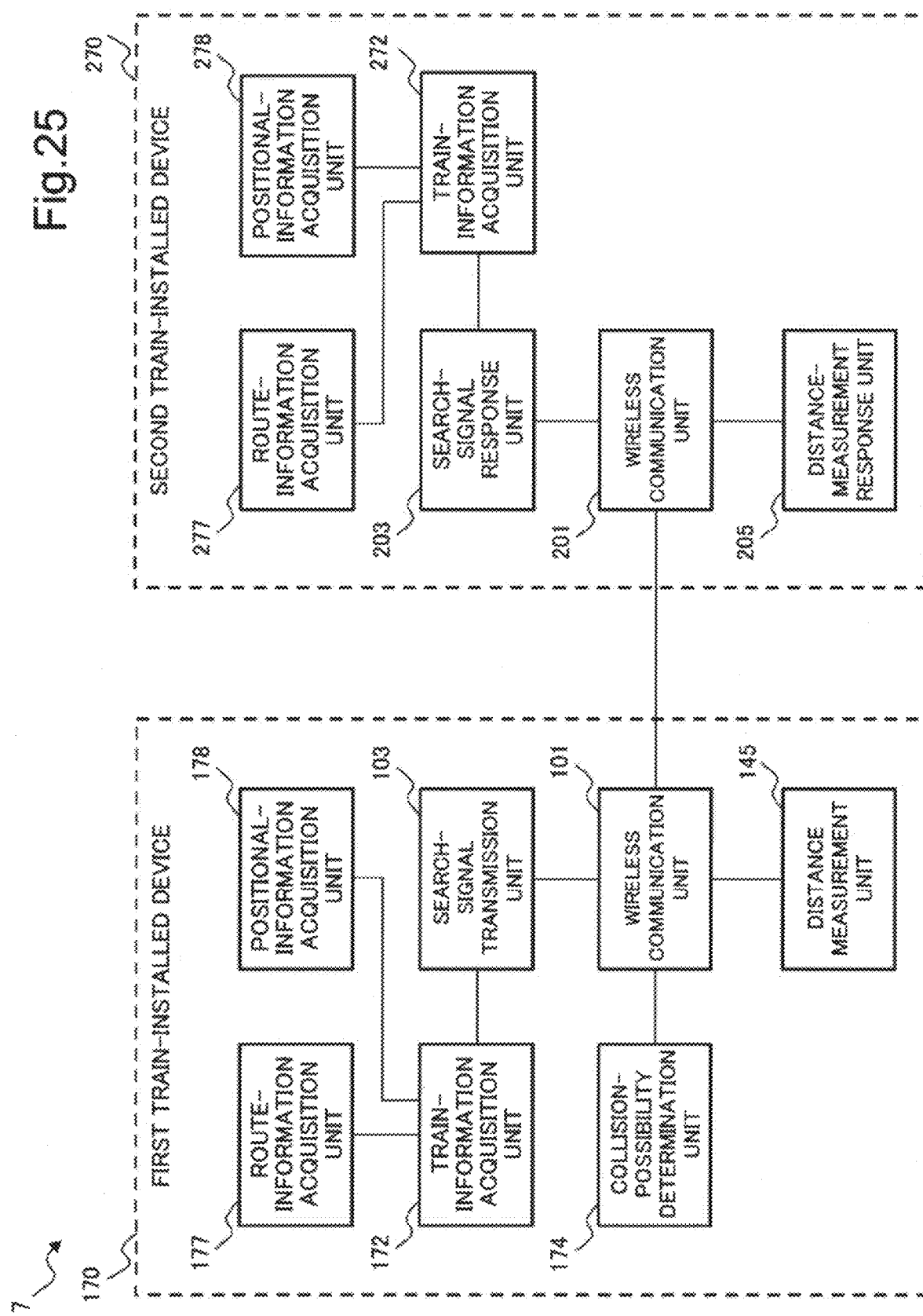
FIG. 25 is a block diagram illustrating a configuration of a train-collision prevention system according to a seventh example embodiment of the present invention.

First, FIG. 25 illustrates a configuration of a train-collision prevention system 7 according to the seventh example embodiment of the present invention. In FIG. 25, the train-collision prevention system 7 differs from the train-collision prevention system 4 according to the fourth example embodiment of the present invention in including a first train-installed device 170 in place of the first train-installed device 140. The train-collision prevention system 7 further differs in including a second train-installed device 270 in place of the second train-installed device 200. The first train-installed device 170 differs from the first train-installed device 140 in including a train-information acquisition unit 172 in place of the train-information acquisition unit 102 and a collision-possibility determination unit 174 in place of the collision-possibility determination unit 144. Furthermore, the first train-installed device 170 differs in further including a route-information acquisition unit 177 and a positional-information acquisition unit 178. Further, the second train-installed device 270 differs from the second train-installed device 200 according to the fourth example embodiment of the present invention in including a train-information acquisition unit 272 in place of the train-information acquisition unit 202, and further including a route-information acquisition unit 277 and a positional-information acquisition unit 278.

Figure 26:
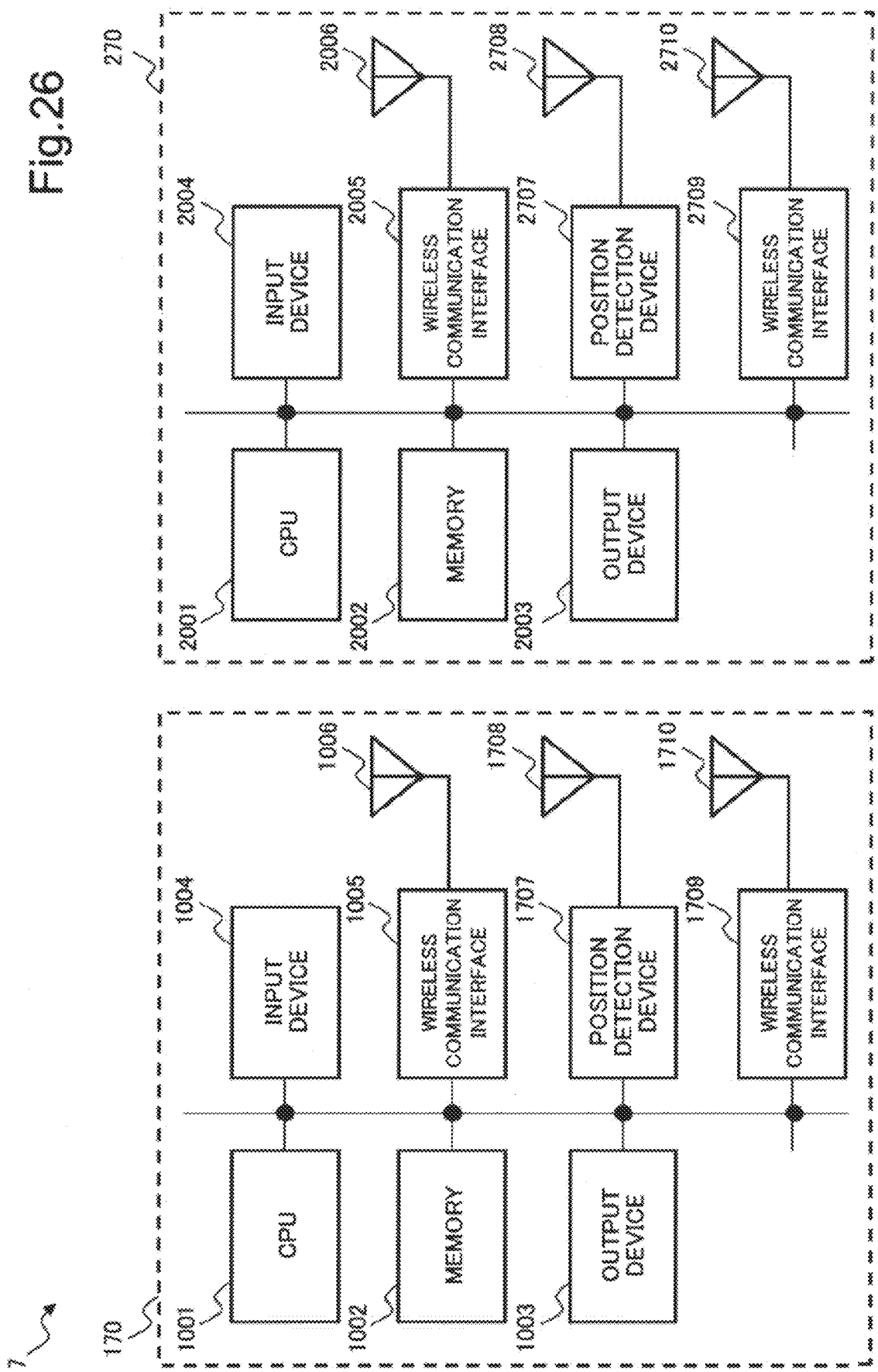
FIG. 26 is a diagram illustrating a hardware configuration example of the train-collision prevention system according to the seventh example embodiment of the present invention.

FIG. 26 illustrates a hardware configuration example of the train-collision prevention system 7. In FIG. 26, the first train-installed device 170 is configured to include a position detection device 1707, an antenna 1708, a wireless communication interface 1709, and an antenna 1710, in addition to hardware elements similar to those in the first train-installed device 100 described with reference to FIG. 2. Further, the second train-installed device 270 is configured to include a position detection device 2707, an antenna 2708, a wireless communication interface 2709, and an antenna 2710, in addition to hardware elements similar to those in the second train-installed device 200 described with reference to FIG. 5.

The antennas 1708 and 2708 receive radio waves for position detection, convert the radio waves into signals, and output the signals. Each of the position detection devices 1707 and 2707 detects position of each of the position detection devices 1707 and 2707, based on a signal output from the antenna 1708 or 2708. The position detection devices 1707 and 2707 may be Global Positioning System (GPS) receivers. In that case, the antennas 2708 and 1708 are configured with GPS antennas.

The wireless communication interfaces 1709 and 2709 are interfaces for performing wireless communications with a ground control facility. Further, each of the wireless communication interfaces 1709 and 2709 outputs data to be transmitted to the antenna 1710 or 2710. Further, each of the wireless communication interfaces 1709 and 2709 receives data output from the antenna 1710 or 2710. Each of the antennas 1710 and 2710 emits data output from the wireless communication interface 1709 or 2709 to a space as a radio wave. Further, each of the antennas 1710 and 2710 receives a radio wave in a space, converts the radio wave into a signal, and outputs the signal to the wireless communication interface 1709 or 2709.

In this case, the route-information acquisition unit 177 is configured with the wireless communication interface 1709, the antenna 1710, and a CPU 1001 executing a program stored in a memory 1002. Further, the route-information acquisition unit 277 is configured with the wireless communication interface 2709, the antenna 2710, and a CPU 2001 executing a program stored in a memory 2002. Further, the positional-information acquisition unit 178 is configured with the position detection device 1707, the antenna 1708, and the CPU 1001 executing a program stored in the memory 1002. Further, the positional-information acquisition unit 278 is configured with the position detection device 2707, the antenna 2708, and the CPU 2001 executing a program stored in the memory 2002. Note that the hardware configurations of the train-collision prevention system 7 and each functional block in the train-collision prevention system 7 are not limited to the configurations described above.

Next, out of functional blocks in the train-collision prevention system 7, functional blocks different from those according to the fourth example embodiment of the present invention will be described in detail.

The route-information acquisition unit 177 in the first train-installed device 170 acquires route information indicating a route on which the train is scheduled to run in the future. For example, route information may be a list of combinations of a railroad ID for identifying a railroad and a section ID for identifying a section. Further, in route information, a combination of a railroad ID and a section ID may be associated with positional information of a position of the railroad in the section.

Further, the route-information acquisition unit 177 may acquire route information from the ground control facility by communicating with the ground control facility. Further, for example, a timing for acquiring route information may be a timing when a train equipped with the first train-installed device 170 is positioned at a starting station, a terminal station, a depot, or the like.

The positional-information acquisition unit 178 in the first train-installed device 170 acquires present positional information of the train.

The train-information acquisition unit 172 in the first train-installed device 170 acquires train information including information indicating a railroad and a section where the train is on-rail, as train information. Specifically, out of routes indicated by route information of the train, the train-information acquisition unit 172 may specify a railroad and a section including a position indicated by present positional information of the train as a railroad and a section where the train is on-rail.

The collision-possibility determination unit 174 determines whether or not there is a possibility of a collision, based on a railroad and a section indicated by train information of the train, and a railroad and a section indicated by train information of another train. The railroad and the section indicated by the train information of the train are information acquired by the train-information acquisition unit 172. Further, the railroad and the section indicated by train information of another train are included in a response signal.

Specifically, the collision-possibility determination unit 174 specifies, in route information, a route on which the train is scheduled to run after running on a railroad and in a section indicated by train information of the train. Then, the collision-possibility determination unit 174 may determine that there is a possibility of a collision when the route on which the train is scheduled to run in the future includes a railroad and a section indicated by train information of another train.

The route-information acquisition unit 277 in the second train-installed device 270 is configured similarly to the route-information acquisition unit 177 in the first train-installed device 170.

The positional-information acquisition unit 278 in the second train-installed device 270 is configured similarly to the positional-information acquisition unit 178 in the first train-installed device 170.

The train-information acquisition unit 272 in the second train-installed device 270 is configured similarly to the train-information acquisition unit 172 in the first train-installed device 170.

An operation of the train-collision prevention system 7 configured as described above will be described with reference to drawings.

Figure 27:
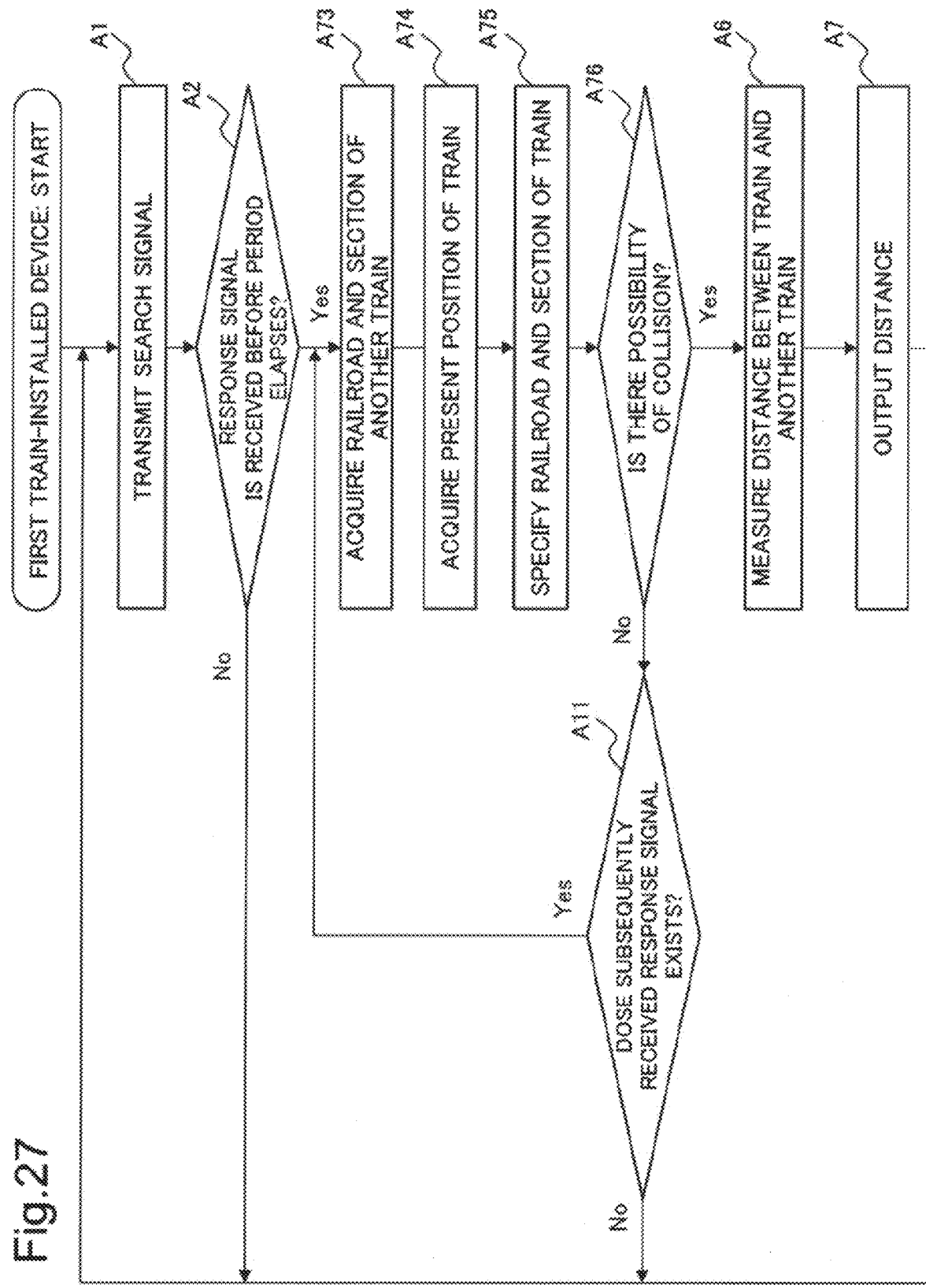
FIG. 27 is a flowchart illustrating an operation of a first train-installed device according to the seventh example embodiment of the present invention.

First, FIG. 27 illustrates an operation of the first train-installed device 170. Note that it is assumed that the first train-installed device 170 already acquires route information by the route-information acquisition unit 177 and stores the route information in the memory 1002 before starting the following operation.

In FIG. 27, first, the search-signal transmission unit 103 executes Steps A1 and A2, similarly to the fourth example embodiment of the present invention. Herewith, a search signal is transmitted, and it is determined whether or not a response signal for the search signal is received. An operation when a response signal is not received before a predetermined period elapses (No in Step A2) is similar to that according to the fourth example embodiment of the present invention.

Then, when a response signal is received (Yes in Step A2), the train-information acquisition unit 172 acquires information indicating a railroad and a section where another train is on-rail from train information of another train included in the response signal (Step A73).

Next, the train-information acquisition unit 172 acquires present positional information of the train by using the positional-information acquisition unit 178 (Step A74).

Next, the train-information acquisition unit 172 specifies a railroad and a section where the train is on-rail, based on the route information in the memory 1002 and the present positional information of the train acquired in Step A74 (Step A75).

Next, the collision-possibility determination unit 174 determines whether or not there is a possibility of a collision between the train and another train, based on the route information, the railroad and the section where another train is on-rail, and the railroad and the section where the train is on-rail (Step A76).

A case of determining that there is a possibility of a collision (Yes in Step A76) will be described. In this case, the first train-installed device 170 executes Steps A6 and A7, similarly to the fourth example embodiment of the present invention. Herewith, a distance between the train and another train is measured, and output.

Then, the first train-installed device 170 repeats the operation from Step A1. Note that, when determining that there is no possibility of a collision in Step A76, the first train-installed device 170 repeats the operation from Step A73 on a subsequently received response signal, similarly to the fourth example embodiment of the present invention. Further, when a subsequently received response signal does not exist, the first train-installed device 170 repeats the operation from Step A1.

Figure 28:
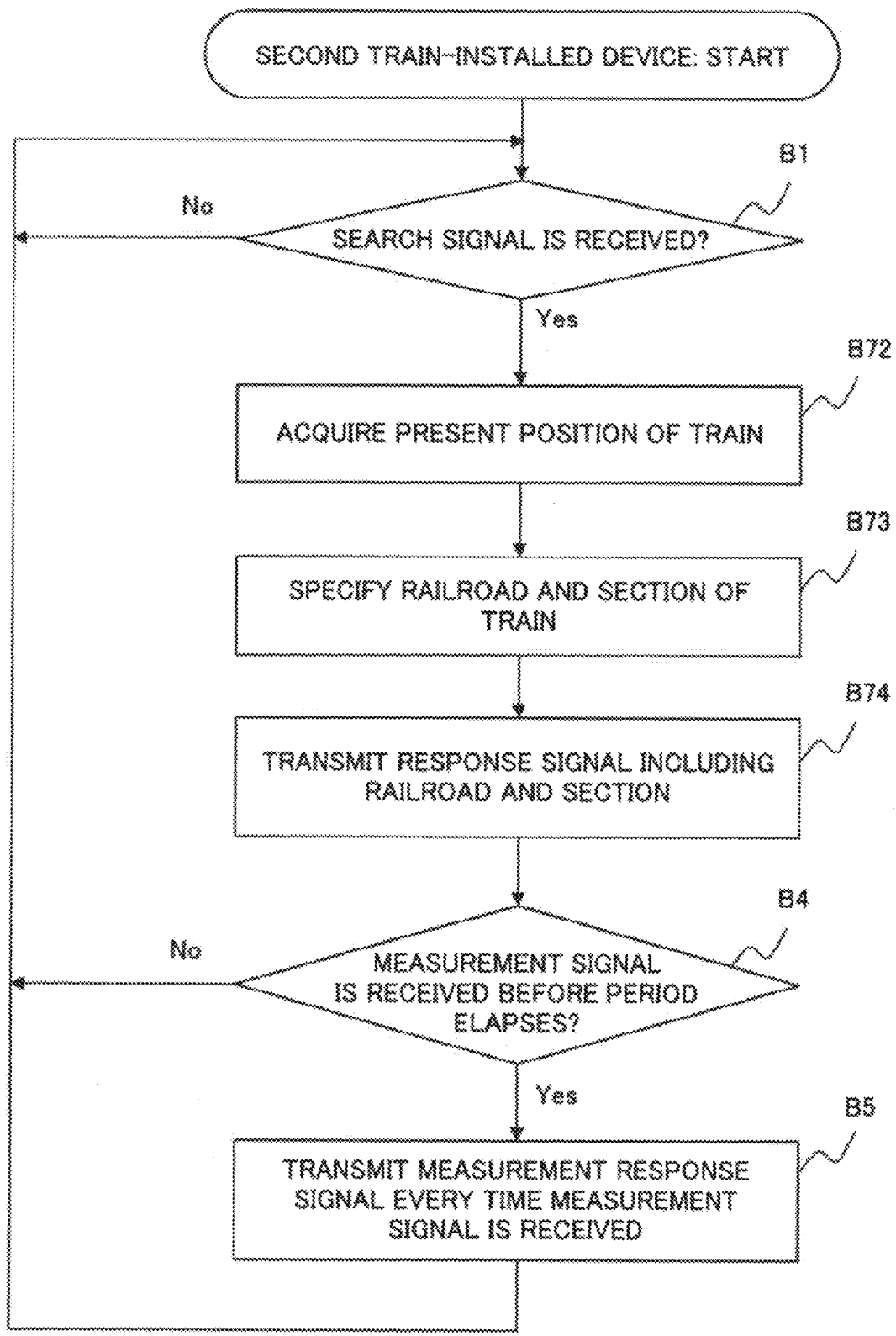
FIG. 28 is a flowchart illustrating an operation of a second train-installed device according to the seventh example embodiment of the present invention.

Next, FIG. 28 illustrates an operation of the second train-installed device 270. Note that it is assumed that the second train-installed device 270 already acquires route information from the route-information acquisition unit 277 and stores the route information in the memory 2002 before starting the following operation.

In FIG. 28, first, when receiving a search signal from the first train-installed device 170 (Yes in Step B1), the train-information acquisition unit 272 acquires present positional information of the train by using the positional-information acquisition unit 278 (Step B72).

Next, the train-information acquisition unit 272 specifies a railroad and a section where the train is on-rail, based on the route information in the memory 2002 and the present positional information of the train acquired in Step B72 (Step B73).

Next, the search-signal response unit 203 includes train information indicating the railroad and the section where the train is on-rail specified in Step B73 in a response signal, and transmits the response signal to the first train-installed device 170 being the source of the search signal (Step B74).

Thereafter, the second train-installed device 270 executes Steps B4 and B5, similarly to the fourth example embodiment of the present invention. Herewith, a measurement response signal is transmitted in response to reception of a measurement signal.

Then, the second train-installed device 270 repeats the operation from Step B1.

The above concludes the operation of the second train-installed device 270.

Next, the seventh example embodiment of the present invention will be described with specific examples. The specific examples assume a depot where a train is already on-rail, or entry to a sidetrack at a skipped station or the like.

Figure 29:
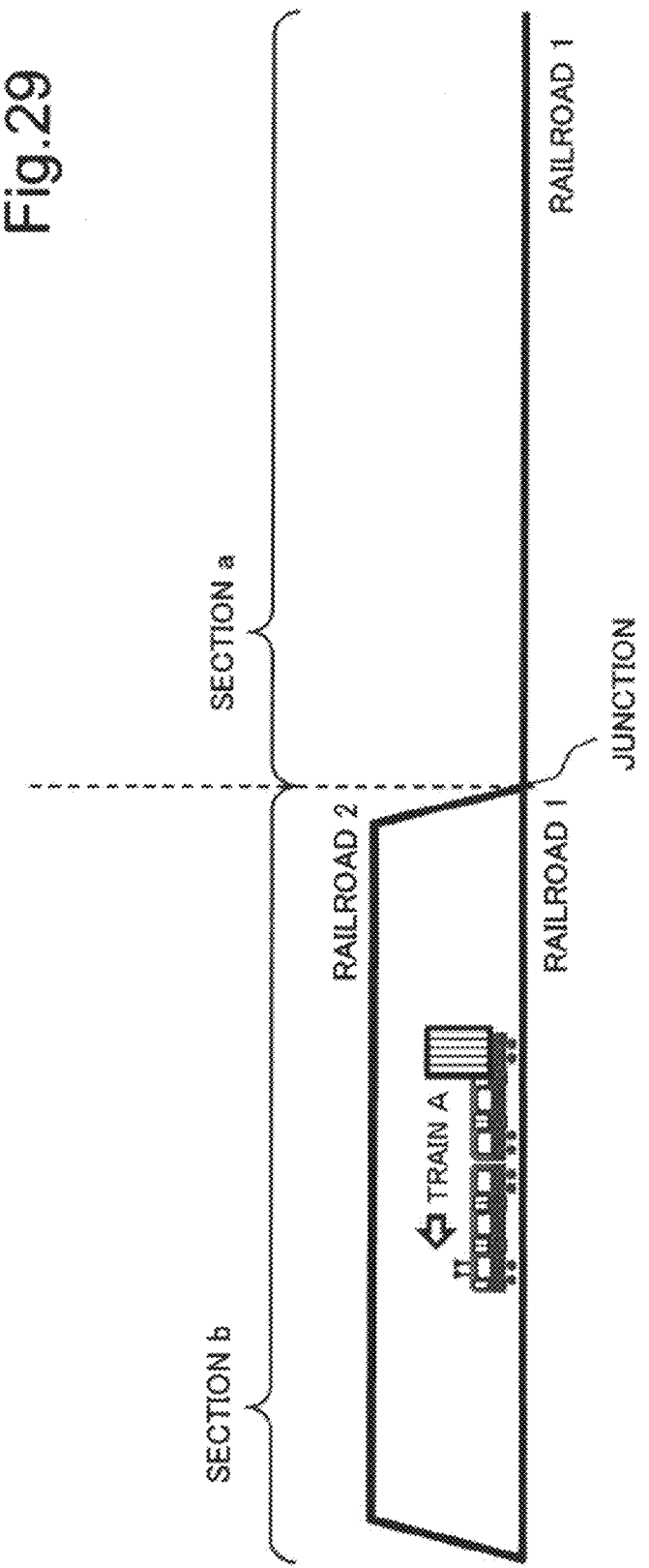
FIG. 29 is a schematic diagram illustrating configurations of railroads and sections in a specific example of the seventh example embodiment of the present invention.

In the specific examples, a railroad configuration is as illustrated in FIG. 29. That is, a railroad 1 exists in a section a. Further, railroads 1 and 2 exist in parallel in a section b. The railroad 1 in the section a is connected to the railroads 1 and 2 in the section b by a junction. Further, it is assumed that a train A stops on the railroad 1 in the section b. In this case, two specific examples will be described.

SPECIFIC EXAMPLE 1

Figure 30:
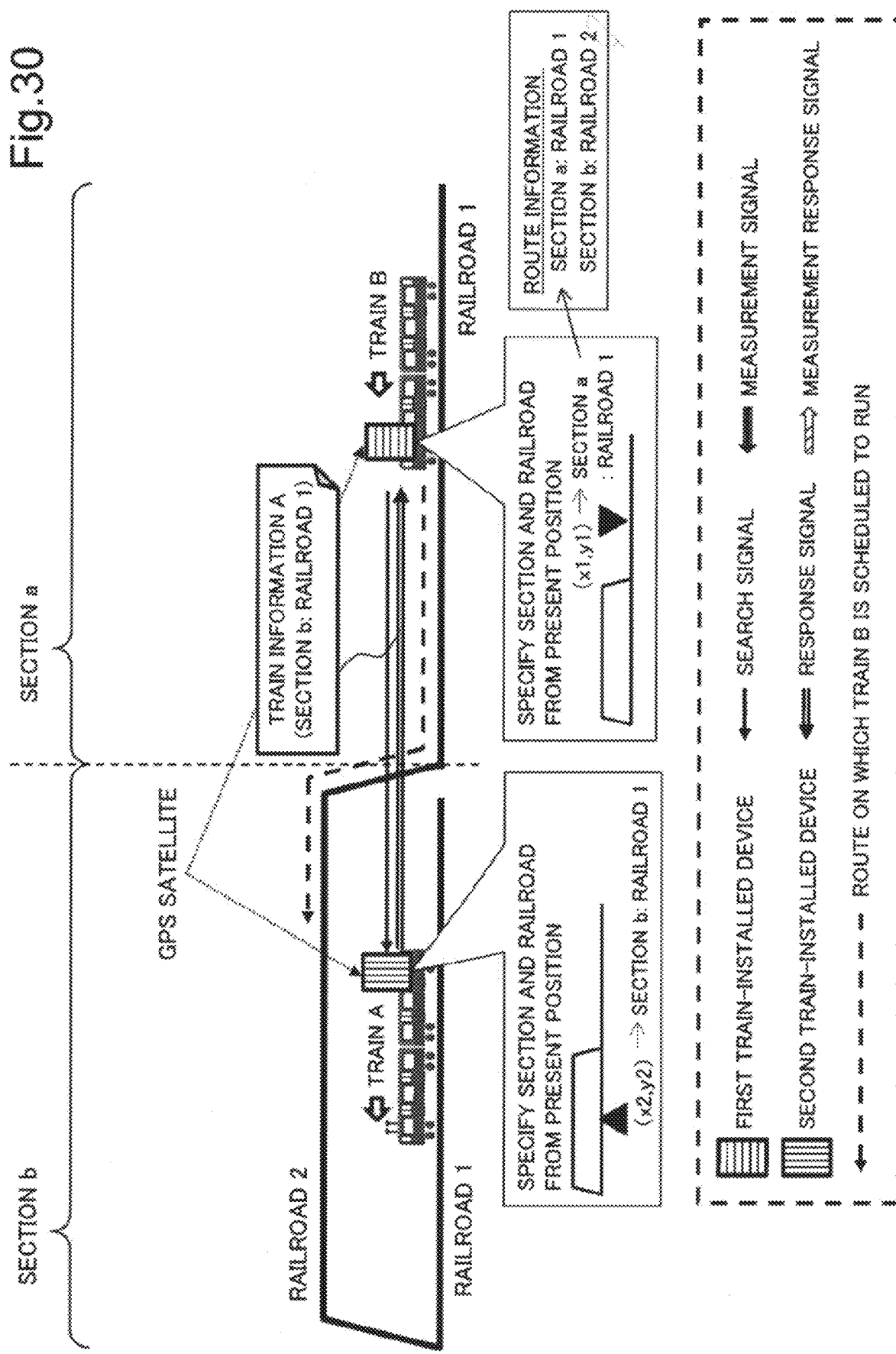
FIG. 30 is a schematic diagram illustrating a case that it is determined that there is no possibility of a collision in the specific example of the seventh example embodiment of the present invention.

It is assumed that a train B runs on the railroad 1 in the section a in a direction toward the section b, as illustrated in FIG. 30.

It is assumed that the route-information acquisition unit 177 in the first train-installed device 170 equipped on the train B already acquires and stores information indicating " . . . , SECTION a: RAILROAD 1, SECTION b: RAILROAD 2" as route information. Note that, in this specific example, it is assumed that route information is expressed as "SECTION x1: RAILROAD y1, SECTION x2: RAILROAD y2, . . . , SECTION xn: RAILROAD yn," and indicates that the train is scheduled to run from a railroad y1 in a section x1 to a railroad yn in a section xn in this order.

At this time, the search-signal transmission unit 103 in the first train-installed device 170 equipped on the train B transmits a search signal. Then, the search-signal response unit 203 in a second train-installed device 270 equipped on the train A within a communicable range receives the search signal (Step A1, Yes in Step B1).

Then, the train-information acquisition unit 272 in the second train-installed device 270 specifies, from the already acquired route information of the train A and present positional information (x2,y2), that the train A is on-rail in "SECTION b: RAILROAD 1" (Steps B72, B73). Then, the search-signal response unit 203 includes train information A indicating "SECTION b: RAILROAD 1" in a response signal, and transmits the response signal to the first train-installed device 170 on the train B (Step B74).

Then, the first train-installed device 170 on the train B receives the response signal (Yes in Step A2). Then, the train-information acquisition unit 172 specifies, from the route information of the train B and present positional information (x1,y1), that the train B is on-rail in "SECTION a: RAILROAD 1" (Steps A74, A75).

Further, the collision-possibility determination unit 174 specifies that a route on which the train is scheduled to run in the future is "SECTION a: RAILROAD 1, SECTION b: RAILROAD 2" in the route information. Then, since the route on which the train is scheduled to run in the future does not include "SECTION b: RAILROAD 1" (acquired in Step A73) indicated by the train information A included in the response signal, the collision-possibility determination unit 174 determines that there is no possibility of a collision and does not calculate a distance (No in Step A76).

SPECIFIC EXAMPLE 2

Figure 31:
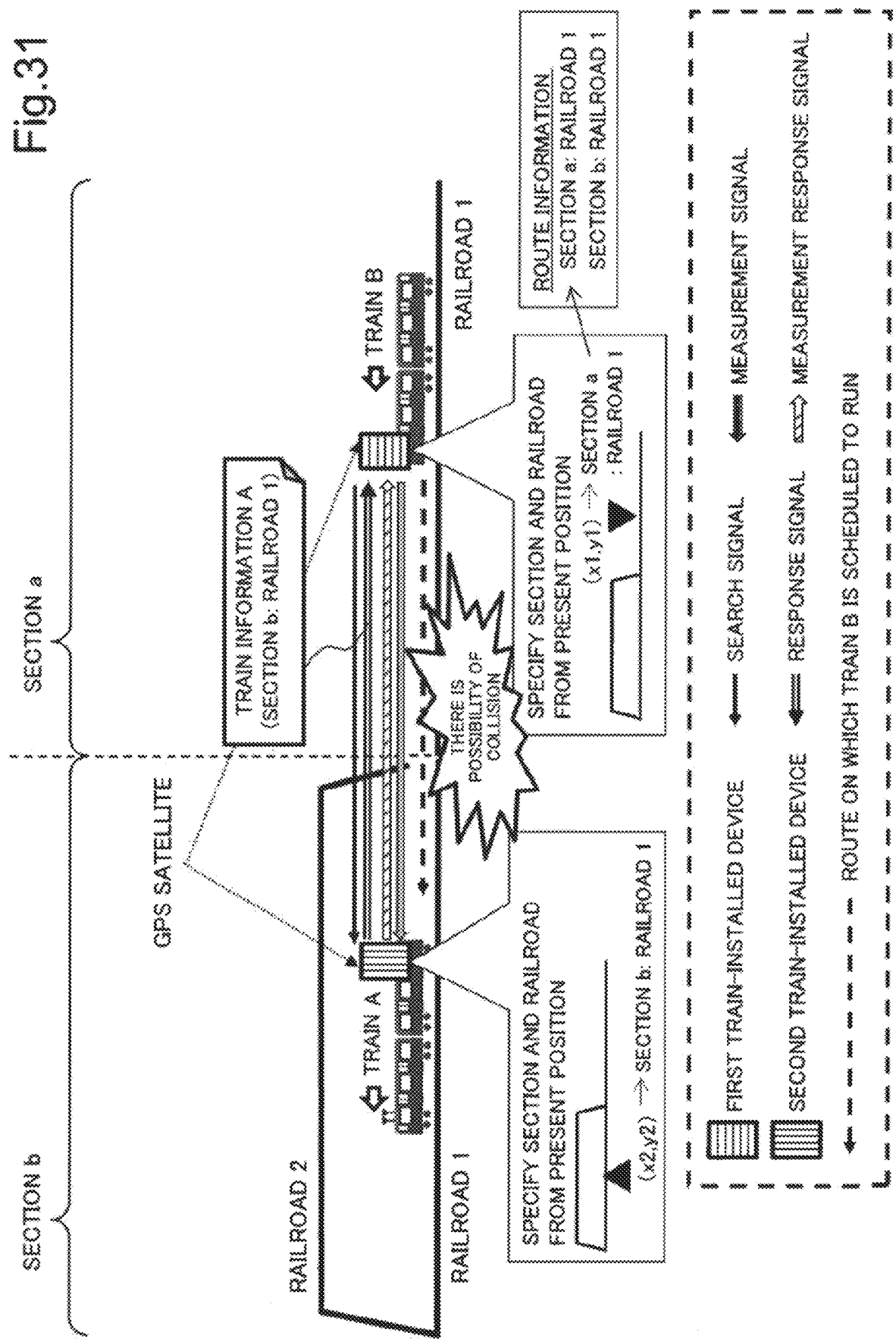
FIG. 31 is a schematic diagram illustrating a case that it is determined that there is a possibility of a collision in the specific example of the seventh example embodiment of the present invention.

It is assumed that a train B runs on the railroad 1 in the section a in a direction toward the section b, as illustrated in FIG. 31.

It is assumed that the route-information acquisition unit 177 in the first train-installed device 170 equipped on the train B already acquires and stores information indicating " . . . , SECTION a: RAILROAD 1, SECTION b: RAILROAD 1" as route information.

In this case, similarly to the specific example 1, a search signal is transmitted from the search-signal transmission unit 103 in the first train-installed device 170 on the train B, and is received by the second train-installed device 270 on the train A (Step A1, Yes in Step B1). Then, the search-signal response unit 203 in the second train-installed device 270 on the train A includes train information A indicating that the train A is on-rail in "SECTION b: RAILROAD 1" in a response signal, and transmits the response signal to the first train-installed device 170 on the train B (Steps B72, B74).

Then, similarly to the specific example 1, the first train-installed device 170 on the train B specifies that the train B is on-rail in "SECTION a: RAILROAD 1" (Steps A74, A75).

Next, the collision-possibility determination unit 174 specifies that a route on which the train is scheduled to run in the future is "SECTION a: RAILROAD 1, SECTION b: RAILROAD 1" in the route information. Then, since the route on which the train is scheduled to run in the future includes "SECTION b: RAILROAD 1" (acquired in Step A73) indicated by the train information A included in the response signal, the collision-possibility determination unit 174 determines that there is a possibility of a collision (Yes in Step A76). Then, the distance measurement unit 145 calculates and outputs a distance between the trains A and B (Steps A6, A7).

The above concludes the description of the specific examples.

Next, an effect of the seventh example embodiment of the present invention will be described.

The train-collision prevention system according to the seventh example embodiment of the present invention can present more suitable information for preventing a collision between trains while holding down an installation cost and a maintenance cost, and considering branching and joining of railroads, even when trains are assumed to run on a plurality of railroads.

The reason will be described. In the present example embodiment, in the first and second train-installed devices, the route-information acquisition unit acquires route information indicating a route on which the train is scheduled to run, in addition to the same configuration as that according to the fourth example embodiment of the present invention. Further, the positional-information acquisition unit acquires present positional information of the train. Then, the train-information acquisition unit acquires information indicating a railroad and a section where the train is on-rail as train information, based on the route information and the present positional information. Then, the collision-possibility determination unit in the first train-installed device determines whether or not there is a possibility of a collision, based on the route information, the railroad and the section indicated by the train information of the train, and the railroad and the section indicated by train information of another train.

Herewith, the present example embodiment can appropriately determine a possibility of a collision between trains, for example, even around a point where railroads branch or join, such as a depot where a train is already on-rail, or entry to a sidetrack at a skipped station or the like.

Note that, in the present example embodiment, an example in which the positional-information acquisition unit uses a GPS receiver and a GPS antenna is described. However, the positional-information acquisition unit may employ other known technologies for acquiring positional information, without being limited to the GPS.

Further, in each of the aforementioned example embodiments of the present invention, each train may be equipped with the first train-installed device at the front and be equipped with the second train-installed device at the rear. In that case, train information according to each example embodiment may include a train ID for identifying a train, and the collision-possibility determination unit in the first train-installed device may determine that there is no possibility of a collision, with respect to a response signal including train information with the same train ID as a train ID acquired by the first train-installed device. Alternatively, the search-signal transmission unit in the first train-installed device may include a train ID of the train in a search signal and transmit the search signal, and the search-signal response unit in the second train-installed device may not respond to the search signal including the same train ID as a train ID of the train.

Further, in each of the aforementioned example embodiments of the present invention, each train may be equipped with the first train-installed device and the second train-installed device configured as an integrated device. In this case, hardware elements constituting each of the first and second train-installed devices may be shared between the first and second train-installed devices except for an antenna installed at the front of the train and an antenna installed at the rear of the train. Further, a functional block having the same name in each of the first and second train-installed devices may be shared between the first and second train-installed devices.

Further, in each of the aforementioned example embodiments of the present invention, it is desirable that the wireless communication units in the first train-installed device and the second train-installed device enable communication within a radius of approximately 1 to 2 kilometers. The above is for satisfying a requirement of "accuracy within a radius of approximately 1 to 2 kilometers from an alarming point, the radius being a reachable range of a radio wave from a train protection wireless device" in the case described above. Note that a communicable range can be adjusted according to a magnitude of transmission output of the wireless communication unit, reception sensitivity performance, efficiency of an employed antenna, and the like. Note that, in wireless communication commonly used in trains, the frequency modulation (FM) is used for analog communication, and the quadrature phase shift keying (QPSK) is used for digital communication. In view of importance of transmitted and received signals according to each of the example embodiments of the present invention, it is desirable that digital communication being highly accurate and highly reliable be employed in each wireless communication unit.

Further, in each of the aforementioned example embodiments of the present invention, an example in which each functional block in the first and second train-installed devices is achieved by a CPU which executes a computer program stored in a memory is mainly described. Without being limited to the above, a part or all of each functional block or a combination thereof may be achieved by dedicated hardware.

Further, in to each of the aforementioned example embodiment of the present invention, the operations of the first and second train-installed devices described with reference to each flowchart may be stored in a storage device (storage medium) in a computer device as a computer program of the present invention. Then, the CPU may read and execute the computer program. Then, in such a case, the present invention is configured with a code of the computer program or the storage medium.

Further, each of the aforementioned example embodiments can be implemented in an appropriately combined manner.

Further, without being limited to each of the aforementioned example embodiments, the present invention may be implemented in various aspects.

The whole or part of the example embodiments disclosed above can be described as, but not limited to, the following supplementary notes.

(Supplementary Note 1)
A first train-installed device includes:
a memory; and
at least one processor coupled to the memory,
the processor performing operations, the operations including:
performing wireless communication through an antenna installed at a front of a train equipped with the first train-installed device;
acquiring train information including information indicating a railroad on which the train is on-rail;
transmitting a search signal for searching for another train in a neighborhood of the train from the wireless communication means; the train;
when receiving a response signal, the response signal being transmitted by a second train-installed device equipped on the another train in response to reception of the search signal and including train information including information indicating a railroad on which the another train is on-rail, determining whether or not there is a possibility of a collision between the train and the another train, based on the train information included in the response signal and the train information acquired; and
when determining that there is a possibility of the collision, measuring a distance between the another train and the train by transmitting and receiving a measurement signal and a measurement response signal indicating a response to the measurement signal to and from the second train-installed device.

(Supplementary Note 2)
The first train-installed device according to supplementary note 1, wherein the operations further include
acquiring the train information further including information indicating a section of the railroad on which the train is on-rail in addition to the information indicating the railroad on which the train is on-rail, and
determining whether or not there is a possibility of the collision, based on the railroad and the section being indicated by the train information of the train and the railroad and the section being indicated by the train information of the another train.

(Supplementary Note 3)

The first train-installed device according to supplementary note 1 or 2, wherein the operations further include:

acquiring route information indicating a route on which the train is scheduled to run; and acquiring present positional information of the train, wherein acquiring the train information, based on the route information and the present positional information, and determining whether or not there is a possibility of the collision, further based on the route information.

(Supplementary Note 4)

The first train-installed device according to any one of supplementary notes 1 to 3, wherein the operations further include synchronizing a timing signal used in the first train-installed device with a predetermined timing with which a timing signal used in the second train-installed device is synchronized, and transmitting the measurement signal at a timing indicated by the timing signal and also measuring the distance, based on a delay time of the measurement signal being included in the measurement response signal.

(Supplementary Note 5)

The first train-installed device according to any one of supplementary notes 1 to 3, wherein the operations further include measuring the distance by using a start-stop synchronization method, based on the measurement signal and the measurement response signal.

(Supplementary Note 6)

The first train-installed device according to any one of supplementary notes 1 to 5, wherein the operations further include, when a plurality of the response signals responding to the same search signal are received, determining a possibility of the collision with priority given to the response signal received earlier, and, with respect to the response signal being received earlier and being determined to have a possibility of the collision, measuring the distance from the another train equipped with the second train-installed device being a source of the response signal.

(Supplementary Note 7)

A second train-installed device includes:

a memory; and at least one processor coupled to the memory, the processor performing operations, the operations including:

performing wireless communication through an antenna installed at a rear of a train equipped with the second train-installed device;

acquiring train information indicating a railroad on which the train is on-rail;

when receiving the search signal from the first train-installed device according to any one of supplementary notes 1 to 6, including train information acquired in the response signal and transmitting the response signal to the first train-installed device; and when receiving the measurement signal from the first train-installed device, transmitting, to the first train-installed device, the measurement response signal responding to the measurement signal.

(Supplementary Note 8)

The second train-installed device according to supplementary note 7, wherein the operations further include acquiring the train information further including information indicating a section of a railroad on which the train is on-rail, in addition to information indicating a railroad on which the train is on-rail.

(Supplementary Note 9)

The second train-installed device according to supplementary note 7 or 8, wherein the operations further include:

acquiring route information indicating a route on which the train is scheduled to run, acquiring present positional information of the train, and acquiring the train information, based on the route information and the present positional information.

(Supplementary Note 10)

The second train-installed device according to any one of supplementary notes 7 to 9, wherein the operations further include:

when the measurement signal is received from the first train-installed device according to supplementary note 4, synchronizing a timing signal used in the second train-installed device with the predetermined timing with which a timing signal used in the first train-installed device is synchronized, calculating a delay time of the measurement signal, based on the timing signal and a reception timing of the measurement signal, including a calculated delay time in the measurement response signal, and transmitting the measurement response signal to the first train-installed device.

(Supplementary Note 11)

The second train-installed device according to any one of supplementary notes 7 to 9, wherein the operation further include, when receiving the measurement signal based on a start-stop synchronization method from the first train-installed device according to supplementary note 5, transmitting the measurement response signal based on a start-stop synchronization method to the first train-installed device.

(Supplementary Note 12)

A train-collision prevention system includes:

the first train-installed device according to any one of supplementary notes 1 to 6; and the second train-installed device according to any one of supplementary notes 7 to 11.

(Supplementary Note 13)

A method includes, by a first train-installed device:

transmitting a search signal for searching for another train in a neighborhood of a train equipped with the first train-installed device, by wireless communication through an antenna installed at a front of the train;

acquiring train information including information indicating a railroad on which the train is on-rail, when receiving, by the wireless communication, a response signal including train information including information indicating a railroad on which the another train is on-rail, the response signal being transmitted, in response to reception of the search signal, by a second train-installed device equipped on the another train;

determining whether or not there is a possibility of a collision between the train and the another train, based on acquired train information and train information included in the response signal; and, when determining that there is a possibility of the collision, measuring a distance between the another train and the train by transmitting and receiving, by the wireless communication, a measurement signal and a measurement response signal indicating a response to the measurement signal, to and from the second train-installed device.

(Supplementary Note 14)

A non-transitory computer-readable recording medium embodying a program, the program causing a computer device to perform a method, the method including:

transmitting a search signal for searching for another train in a neighborhood of a train equipped with a first train-installed device, by wireless communication through an antenna installed at a front of the train;

acquiring train information including information indicating a railroad on which the train is on-rail, when receiving, by the wireless communication, a response signal including train information including information indicating a railroad on which the another train is on-rail, the response signal being transmitted, in response to reception of the search signal, by a second train-installed device equipped on the another train;

of determining whether or not there is a possibility of a collision between the train and the another train, based on acquired train information and train information included in the response signal; and when determining that there is a possibility of the collision, measuring a distance between the another train and the train by transmitting and receiving, by the wireless communication, a measurement signal and a measurement response signal indicating a response to the measurement signal, to and from the second train-installed device.

(Supplementary Note 15)

A method includes, by a second train-installed device:

when receiving the search signal from the first train-installed device executing the method according to supplementary note 13, by wireless communication through an antenna installed at a rear of the train equipped with the first train-installed device, acquiring train information indicating a railroad on which the train is on-rail, including acquired train information in the response signal, and transmitting the response signal to the first train-installed device by the wireless communication; and, when receiving the measurement signal from the first train-installed device by the wireless communication, transmitting, to the first train-installed device by the wireless communication, the measurement response signal responding to the measurement signal.

(Supplementary Note 16)

A non-transitory computer-readable recording medium embodying a program, the program causing a computer device to perform a method, the method including:

processing of receiving the search signal from the first train-installed device executing the program recorded on the recording medium according to supplementary note 14, by wireless communication through an antenna installed at a rear of the train equipped with the first train-installed device;

processing of acquiring train information indicating a railroad on which the train is on-rail, including acquired train information in the response signal, and transmitting the response signal to the first train-installed device by the wireless communication; and processing of, when receiving the measurement signal from the first train-installed device by the wireless communication, transmitting, to the first train-installed device by the wireless communication, the measurement response signal responding to the measurement signal.

The present invention has been described above with the aforementioned example embodiments as example examples. However, the present invention is not limited to the aforementioned example embodiments. In other words, various aspects that may be understood by a person skilled in the art may be applied to the present invention, within the scope of the present invention.

This application is based upon and claims the benefit of priority from Japanese patent application No. 2016-252661, filed on Dec. 27, 2016, the disclosure of which is incorporated herein in its entirety by reference.

REFERENCE SIGNS LIST 3, 4, 5, 6, 7 Train-collision prevention system
100, 140, 150, 160, 170 First train-installed device
101 Wireless communication unit
102, 172 Train-information acquisition unit
103 Search-signal transmission unit
104, 144, 174 Collision-possibility determination unit
105, 145, 155, 165 Distance measurement unit
156 Synchronization unit
177 Route-information acquisition unit
178 Positional-information acquisition unit
200, 250, 260, 270 Second train-installed device
201 Wireless communication unit
202, 272 Train-information acquisition unit
203 Search-signal response unit
205, 255, 265 Distance-measurement response unit
256 Synchronization unit
277 Route-information acquisition unit
278 Positional-information acquisition unit
1001, 2001 CPU
1002, 2002 Memory
1003, 2003 Output device
1004, 2004 Input device
1005, 2005, 1709, 2709 Wireless communication interface
1006, 1008, 1708, 1710, 2006, 2008, 2708, 2710 Antenna
1007, 2007 Timing detection device
1707, 2707 Position detection device

What is claimed is:

1. A first train-installed device comprising:
a memory; and
at least one processor coupled to the memory,
the processor performing operations, the operations comprising:
performing wireless communication through an antenna installed at a front of a train equipped with the first train-installed device;
acquiring train information including information indicating a railroad on which the train is on-rail;
transmitting a search signal for searching for another train in a neighborhood of the train;
when receiving a response signal, the response signal being transmitted by a second train-installed device equipped on the another train in response to reception of the search signal and including train information including information indicating a railroad on which the another train is on-rail, determining whether or not there is a possibility of a collision between the train and the another train, based on the train information included in the response signal and the train information acquired;
when determining that there is the possibility of the collision, measuring a distance between the another train and the train by transmitting and receiving a measurement signal and a measurement response signal indicating a response to the measurement signal to and from the second train-installed device;
acquiring route information indicating a route on which the train is scheduled to run, and acquiring present positional information of the train;

acquiring the train information, based on the route information and the present positional information; and determining whether or not there is the possibility of the collision, further based on the route information.

2. The first train-installed device according to claim 1, wherein the operations further comprise acquiring the train information further including information indicating a section of the railroad on which the train is on-rail in addition to the information indicating the railroad on which the train is on-rail, and determining whether or not there is the possibility of the collision, further based on the railroad and the section being indicated by the train information of the train and the railroad and the section being indicated by the train information of the another train.

3. The first train-installed device according to claim 1, wherein the operations further comprise synchronizing a timing signal used in the first train-installed device with a predetermined timing with which a timing signal used in the second train-installed device is synchronized, and transmitting the measurement signal at a timing indicated by the timing signal and also measuring the distance, based on a delay time of the measurement signal being included in the measurement response signal.

4. The first train-installed device according to claim 1, wherein the operations further comprise measuring the distance by using a start-stop synchronization method, based on the measurement signal and the measurement response signal.

5. The first train-installed device according to claim 1, wherein the operations further comprise, when a plurality of the response signals responding to a same search signal are received, determining the possibility of the collision with priority given to the response signal received earlier, and, with respect to the response signal being received earlier and being determined to have the possibility of the collision, measuring the distance from the another train equipped with the second train-installed device being a source of the response signal.

6. A method comprising, by a first train-installed device:

transmitting a search signal for searching for another train in a neighborhood of a train equipped with the first train-installed device, by wireless communication through an antenna installed at a front of the train;

acquiring train information including information indicating a railroad on which the train is on-rail, when receiving, by the wireless communication, a response signal including train information including information indicating a railroad on which the another train is on-rail, the response signal being transmitted, in response to reception of the search signal, by a second train-installed device equipped on the another train;

determining whether or not there is a possibility of a collision between the train and the another train, based on acquired train information and train information included in the response signal;

when determining that there is the possibility of the collision, measuring a distance between the another train and the train by transmitting and receiving, by the wireless communication, a measurement signal and a measurement response signal indicating a response to the measurement signal, to and from the second train-installed device;

acquiring route information indicating a route on which the train is scheduled to run, and acquiring present positional information of the train;

acquiring the train information, based on the route information and the present positional information; and determining whether or not there is a possibility of the collision, further based on the route information.

7. A non-transitory computer-readable recording medium embodying a program, the program causing a computer to perform a method, the method comprising:

transmitting a search signal for searching for another train in a neighborhood of a train equipped with a first train-installed device, by wireless communication through an antenna installed at a front of the train;

acquiring train information including information indicating a railroad on which the train is on-rail, when receiving, by the wireless communication, a response signal including train information including information indicating a railroad on which the another train is on-rail, the response signal being transmitted, in response to reception of the search signal, by a second train-installed device equipped on the another train;

determining whether or not there is a possibility of a collision between the train and the another train, based on acquired train information and train information included in the response signal;

when determining that there is the possibility of the collision, measuring a distance between the another train and the train by transmitting and receiving, by the wireless communication, a measurement signal and a measurement response signal indicating a response to the measurement signal, to and from the second train-installed device;

acquiring route information indicating a route on which the train is scheduled to run, and acquiring present positional information of the train;

acquiring the train information, based on the route information and the present positional information; and determining whether or not there is a possibility of the collision, further based on the route information.

* * * * *